US008634360B2

(12) United States Patent
Liu et al.

(10) Patent No.: US 8,634,360 B2
(45) Date of Patent: Jan. 21, 2014

(54) NETWORK-ASSISTED CELL ACCESS

(75) Inventors: Ke Liu, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 630 days.

(21) Appl. No.: 12/845,643

(22) Filed: Jul. 28, 2010

(65) Prior Publication Data

US 2011/0182252 A1 Jul. 28, 2011

Related U.S. Application Data

(60) Provisional application No. 61/230,657, filed on Jul. 31, 2009.

(51) Int. Cl.
*H04W 4/00* (2009.01)

(52) U.S. Cl.
USPC .......................................... 370/329; 370/338

(58) Field of Classification Search
None
See application file for complete search history.

(56) References Cited

U.S. PATENT DOCUMENTS

| 7,164,918 B2* | 1/2007 | Moulsley et al. ............. 455/450 |
| 2007/0183427 A1 | 8/2007 | Nylander et al. |
| 2007/0274249 A1* | 11/2007 | Hulbert et al. ................. 370/326 |
| 2008/0207170 A1 | 8/2008 | Khetawat et al. |
| 2008/0267131 A1 | 10/2008 | Kangude et al. |
| 2009/0098871 A1 | 4/2009 | Gogic |
| 2009/0170498 A1* | 7/2009 | Venkatasubramanian et al. .......................... 455/422.1 |
| 2010/0144317 A1* | 6/2010 | Jung et al. ..................... 455/411 |
| 2010/0238845 A1* | 9/2010 | Love et al. ..................... 370/280 |
| 2010/0272086 A1* | 10/2010 | Jung et al. ..................... 370/338 |
| 2011/0195719 A1* | 8/2011 | Chmiel et al. ................. 455/450 |

FOREIGN PATENT DOCUMENTS

WO WO2009069934 6/2009

OTHER PUBLICATIONS

International Search Report and Written Opinion—PCT/US2010/043837, International Search Authority—European Patent Office—Jan. 11, 2011.
Partial International Search Report—PCT/US2010/043837—International Search Authority, European Patent Office, Oct. 28, 2010.

* cited by examiner

*Primary Examiner* — Xavier S. Wong
(74) *Attorney, Agent, or Firm* — Nerrie M. Zohn

(57) ABSTRACT

Providing for access point assisted signal acquisition for heterogeneous access point wireless networks is described herein. By way of example, a closed subscriber group (CSG) base station, such as a home NodeB (HNB) can be configured to provide temporary, limited access to a UE that is not authorized to access the HNB. Upon receiving and rejecting an access probe, the HNB can negotiate with a surrounding macro network to provide service for the UE. Further, the HNB can forward signal acquisition data, to assist in proper decoding of pilot or synchronization signals of the macro network. In particular aspects, the HNB can reduce power or blank transmissions on reserved access resources to reduce interference for the UE. By these and other disclosed mechanisms, the HNB can assist a non-CSG subscriber to obtain network service, and mitigate interference effects due to proximity to the UE.

22 Claims, 19 Drawing Sheets

NETWORK-ASSISTED CELL ACCESS

CLAIM OF PRIORITY UNDER 35 U.S. C §119

The present application for patent claims priority to Provisional Patent Application Ser. No. 61/230,657 entitled "NETWORK ASSISTED CELL ACCESS" and filed Jul. 31, 2009, assigned to the assignee hereof and hereby expressly incorporated by reference herein.

BACKGROUND

I. Field

The following relates generally to wireless communication, and more specifically to access point assisted network access for improved wireless communication in heterogeneous access point environments.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

In recent years, users have started to replace fixed line communications with mobile communications and have increasingly demanded great voice quality, reliable service, and low prices. Mobile phone networks have evolved to provide voice services, data services, as well as a range of multimedia services for mobile communications. In addition to mobile phone networks currently in place, a new class of small base stations has emerged, which can be installed in a user's home and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the mobile operator's network via digital subscriber line (DSL) router, cable modem, or other broadband Internet connection.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for assisted network access for wireless networks comprising closed subscriber group (CSG) base stations, also referred to as home Node B (HNB) or Femto base stations. An HNB (or enhanced HNB) can be configured to provide temporary, limited access to a user equipment that is not part of a CSG for the HNB. Upon receiving and rejecting an access probe by the user equipment, the HNB can be configured to identify and negotiate with neighboring general access base stations to provide service for the user equipment. For instance, the HNB can provide access information to the user equipment, such as a cell identifier and relative timing information, to assist in proper decoding of pilot or synchronization signals of the general access base station. Additionally, the HNB can negotiate reserved resources for communication between the user equipment and general access base station. By reducing power or blanking transmissions on these reserved resources, the HNB can significantly reduce interference for that communication, increasing likelihood that the user equipment can access the general access base station. By these and other disclosed mechanisms, the HNB can assist a non-CSG subscriber to obtain network service, and can mitigate interference effects due to proximity to the user equipment.

In another aspect, a user equipment is provided that is configured to perform a secondary access upon failure of an access probe. If access failure results from not being within a CSG of a HNB, for instance, the secondary access probe can be utilized to acquire a limited access with the HNB in which the HNB acts as a proxy for a macro network. The HNB can assist the user equipment in acquiring a signal of a macro base station. Once acquired, the user equipment can then transmit an access probe to the macro base station. In at least one aspect of the subject disclosure, the user equipment can perform neighboring cell signal measurements and submits results of these measurements to the HNB. The HNB forwards the results to a network entity associated with the macro wireless network, which can select a serving base station from candidate base stations within a vicinity of the user equipment. Accordingly, the macro base station most likely to overcome interference with the HNB can be selected to serve the user equipment, increasing likelihood of proper transition to the macro wireless network.

According to further aspects of the subject disclosure, provided is a method for improved cell access in a heterogeneous access point wireless environment. The method can comprise detecting the presence of a dominant interferer. Additionally, the method can comprise decoding a signal of the dominant interferer. Moreover, the method can comprise executing a secondary access procedure to the dominant interferer, wherein the secondary access procedure is in accordance with a limited access protocol.

According to other aspects, disclosed is an apparatus for wireless communication. The apparatus can comprise a wireless communication interface for exchanging wireless signals with a wireless network. Further, the apparatus can comprise a memory for storing instructions configured to obtain conditional network access upon a failed access request, and a data processor that executes modules to implement the instructions. Specifically, the modules can comprise a demodulator that detects the presence of a dominant interferer and that decodes a signal of the dominant interferer. In addition, the modules can comprise a conditional access module that sends an access probe to the dominant interferer according to a modified access protocol.

In still other aspects, disclosed is an apparatus configured for network-assisted cell access. The apparatus can comprise means for detecting the presence of a dominant interferer.

Additionally, the apparatus can comprise means for decoding a signal of the dominant interferer. Moreover, the apparatus can comprise means for executing a secondary access procedure to the dominant interferer, wherein the secondary access procedure is in accordance with a limited access protocol.

According to one or more other aspects, provided is at least one processor configured for network-assisted cell access. The processor(s) can comprise a first module for detecting the presence of a dominant interferer. Moreover, the processor(s) can comprise a second module for decoding a signal of the dominant interferer. Further to the above, the apparatus can comprise a third module for executing a secondary access procedure to the dominant interferer, wherein the secondary access procedure is in accordance with a limited access protocol.

In at least one other aspect, the subject disclosure provides a computer program product comprising a computer-readable medium. The computer-readable medium can comprise a first set of codes for causing a computer to detect the presence of a dominant interferer. Moreover, the computer-readable medium can comprise a second set of codes for causing the computer to decode a signal of the dominant interferer. Additionally, the computer-readable medium can comprise a third set of codes for causing the computer to execute a secondary access procedure to the dominant interferer, wherein the secondary access procedure is in accordance with a limited access protocol.

Further to the above, the subject disclosure provides a method of network-assisted wireless access. The method can comprise receiving a network access probe, and accessing a closed subscriber group (a CSG) and identifying the network access probe as originating from a member or a non-member of the CSG. Further, the method can comprise providing temporary access assistance in response to the network access probe if the network access probe originates from the non-member of the CSG.

According to other aspects, disclosed is an apparatus for wireless communication. The apparatus can comprise a wireless communication interface that receives and decodes a network access probe. Furthermore, the apparatus can comprise memory for storing modules configured to provide limited cell access for network acquisition. Moreover, the apparatus can comprise a data processor for executing the modules. Specifically, the modules can comprise a reference module that accesses a CSG and identifies the access probe as originating from a member or a non-member of the CSG. Further, the set of modules can comprise a limited access module that provides limited service for network access in response to the network access probe if the reference module identifies the network access probe as originating from the non-member of the CSG.

In still other disclosed aspects, provided is an apparatus for network-assisted wireless access. The apparatus can comprise means for receiving a network access probe transmitted on a wireless uplink. In addition, the apparatus can comprise means for accessing a CSG and determining whether a device transmitting the network access probe is a member or a non-member of the CSG. Further, the apparatus can comprise means for providing limited service for network access in response to the network access probe if the device is the non-member of the CSG.

In yet other aspects, the subject disclosure provides at least one processor configured for network-assisted wireless access. The processor(s) can comprise a first module for receiving a network access probe on a wireless uplink and a second module for accessing a CSG and determining whether a device transmitting the network access probe is a member or a non-member of the CSG. Additionally, the processor(s) can comprise a third module for providing limited service for network access in response to the network access probe if the device is the non-member of the CSG.

In at least one other aspect, the subject disclosure provides a computer program product comprising a computer-readable medium. The computer-readable medium can comprise a first set of codes for causing a computer to receive a network access probe on a wireless uplink. Further, the computer-readable medium can comprise a second set of codes for causing the computer to access a CSG and identify whether a device transmitting the network access probe is a member or a non-member of the CSG. Additionally, the computer-readable medium can comprise a third set of codes for causing the computer to provide limited service for network access in response to the network access probe if the device is the non-member of the CSG.

In addition to the foregoing, the subject disclosure provides for a method of network-assisted cell access. The method can comprise obtaining a network access request relayed from a neighboring closed subscriber group base station (a neighboring CSG BS). Furthermore, the method can comprise identifying a serving BS for the network access request. Still further, the method can comprise forwarding a cell ID and timing information of the serving BS via the neighboring CSG BS to a requesting AT if the requesting AT is authorized for network access.

In one or more additional aspects, disclosed is an apparatus for facilitating network-assisted wireless access. The apparatus can comprise a communication interface that obtains a network access probe relayed to the apparatus from a neighboring CSG BS. Further, the apparatus can comprise a memory that stores instructions configured to facilitate network access assistance for the neighboring CSG BS and a data processor that executes modules to implement the instructions. These modules can include an admission control module to determine whether a BS associated with the apparatus is to be a serving BS for a device transmitting the network access probe. Moreover, the modules can include an interface module that forwards a cell ID and timing information of the BS via the neighboring CSG BS to a requesting AT if the admission control module determines that the requesting AT is authorized for network access.

According to further aspects, provided is an apparatus that facilitates network-assisted wireless access. The apparatus can comprise means for obtaining a network access request relayed from a neighboring CSG BS. Additionally, the apparatus can comprise means for identifying a serving BS for a device transmitting the network access probe. Moreover, the apparatus can comprise means for forwarding a cell ID and timing information of the serving BS via the neighboring CSG BS to a requesting AT if the requesting AT is authorized for network access.

In at least one aspect, disclosed is at least one processor configured for facilitating network-assisted wireless access. The processor(s) can comprise a first module that obtains a network access probe relayed from a neighboring CSG BS. The processor(s) can also comprise a second module that identifies a serving BS for a device transmitting the network access probe. Furthermore, the processor(s) can comprise a third module that forwards a cell ID and timing information of the serving BS via the neighboring CSG BS to a requesting AT if the requesting AT as authorized for network access.

In other aspects, the subject disclosure provides a computer program product comprising a computer-readable medium. The computer-readable medium can comprise a first set of codes for causing a computer to obtain a network access probe relayed from a neighboring CSG BS. Additionally, the computer-readable medium can comprise a second set of codes for causing the computer to identify a serving BS for a device transmitting the network access probe. Further to the above, the computer-readable medium can also comprise a third set of codes for causing the computer to forward a cell ID and timing information of the serving BS via the neighboring CSG BS to a requesting AT if the requesting AT is authorized for network access.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
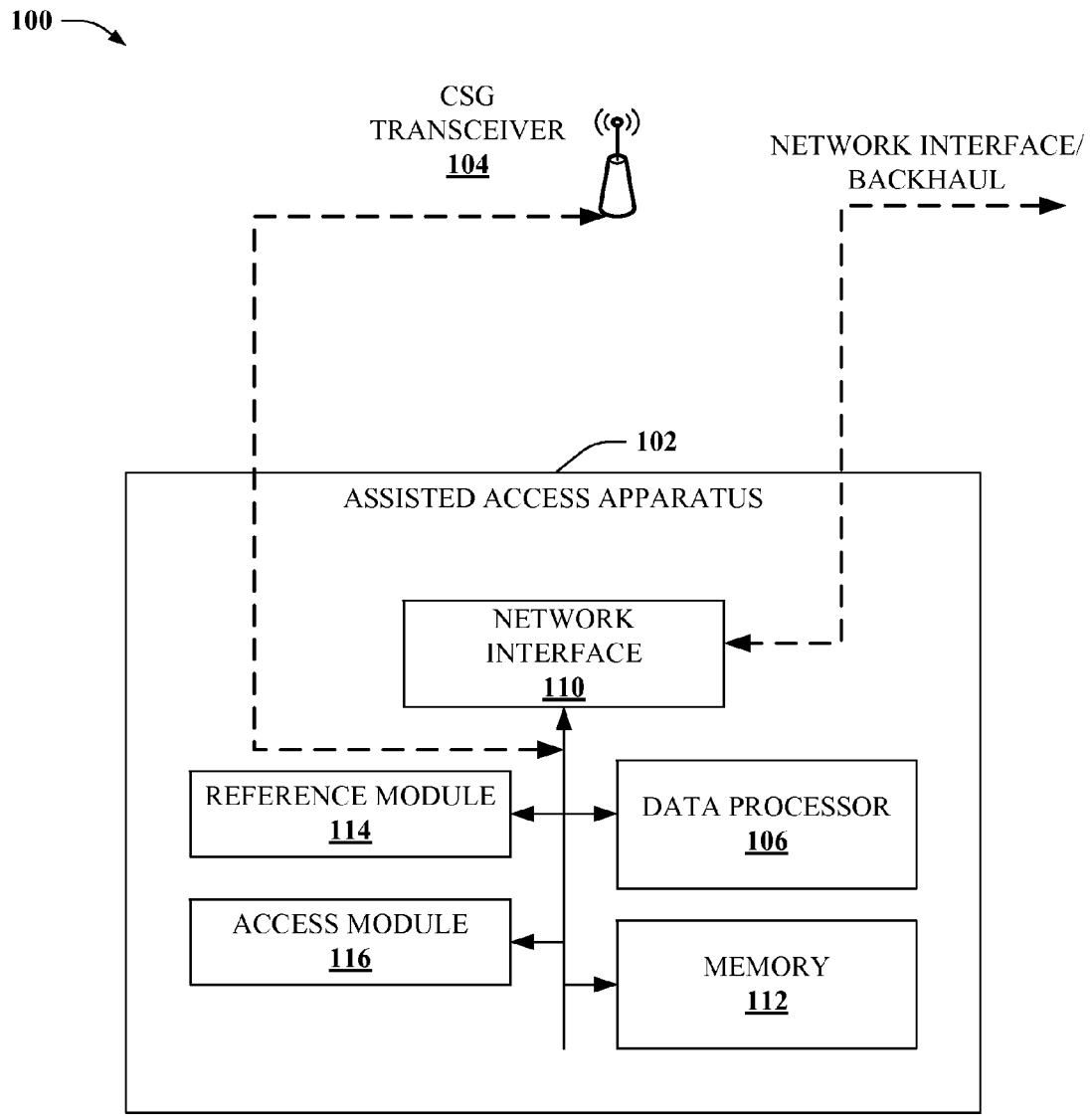
FIG. 1 illustrates a block diagram of an example access point base station configured for limited network access according to one or more aspects disclosed herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing improved network acquisition in a heterogeneous access point wireless environment, among other things. One skilled in the art should appreciate that similar techniques could apply to other communication environments.

Planned deployments of wireless base stations (BSs) in a wireless access network (AN) typically consider position, spacing and transmission/receive characteristics of transceiver devices. One goal of planned base station deployment is to reduce interference among transmitters. Thus, for instance, one deployment plan might space different base stations apart by a distance approximately equal to their respective maximum transmit ranges. In this type of deployment, signal interference between the base stations is minimized.

In unplanned or semi-planned BS deployments, wireless transmitters are often not positioned to reduce interference. Instead, it is not unusual with semi or unplanned deployments for two or more transmitting BSs (e.g., that transmit into substantially 360 degrees) to be in close proximity. Furthermore, such deployments often include base stations that transmit at significantly different power, covering a wide range of service areas (e.g., also referred to as a heterogeneous transmit power environment). As an example, a high power BS (e.g., macro cell at 20 watts) may be situated proximate a mid or low power transmitter (e.g., micro cell, pico cell, Femto cell, etc., of varying transmission power, e.g., 8 watts, 3 watts, 1 watt, and so on). The higher power transmitter can be a significant source of interference for the mid and/or low power transmitters. Furthermore, lower power transmitters can be a significant source of interference for the high power BS, particularly for terminals close to such transmitters. Accordingly, signal interference in semi or un-planned environments and/or heterogeneous transmit power environments can often be a significant problem as compared with the conventional planned macro base station AN.

In addition to the foregoing, closed subscriber group (CSG) or restricted access BSs (e.g., an access point BS, HNB, Femto BS, enhanced HNB [HeNB]) can compound problems resulting from semi and un-planned BS deployment. For instance, a CSG BS can selectively provide access to one or more terminal devices, denying network access to other such devices. Accordingly, devices are forced to search for other BSs if denied access, and often observe significant interference from the denying BS. As utilized herein, a CSG BS can also be termed a private BS (e.g., a Femto cell BS or an HNB), or some similar terminology.

Further to the above, un-planned, heterogeneous and CSG deployments can lead to poor geometric conditions for a wireless network. Even without restricted association or closed subscriber groups, a device that observes a very strong signal from a macro BS could be configured to prefer to connect to a Femto BS, because the Femto BS is "closer" to the terminal in terms of path-loss. Thus, the Femto BS is capable of serving the terminal at a comparable data rate while causing less interference to the wireless network. However, if the terminal is not included in a CSG of the Femto BS, the terminal will not be granted access by this preferred BS. Especially when in close proximity to the Femto BS, the terminal can observe significant interference, resulting in a low signal to noise ratio (SNR) at the terminal (e.g., possibly rendering the macro BS undetectable by the terminal). In this scenario, the Femto BS is a dominant interferer, and can result in failed network access by the terminal, if pilot signals of the macro BS are not detectable or decodable due to the interference.

FIG. 1 illustrates a block diagram of an example HNB 100 configured to provide limited access to non-CSG terminals for the purpose of facilitating macro network access. HNB 100 comprises an assisted access apparatus 102 coupled with a CSG transceiver 104. Assisted access apparatus 102 and CSG transceiver 104 can be a single unit (e.g., a router-sized access point BS), or can be separate physical units, for instance in the case of a computing device (e.g., comprising assisted access apparatus 102) with an externally connected transceiver (e.g., comprising CSG transceiver 104). In either case, HNB 100 is configured to transmit wirelessly on a DL channel employing licensed cellular frequencies. Furthermore, HNB 100 is configured to receive and decode UL transmissions on those licensed cellular frequencies. Accordingly, HNB 100 is suited to wirelessly interface with a cellular access terminal, or other similar device.

Assisted access apparatus 102 comprises a network interface 110 that can be configured to communicatively couple with a wireless service provider's network (e.g., via an Internet connection to an Internet gateway of such provider's network). In some aspects, network interface 110 can comprise a broadband Internet connection (e.g., DSL modem, cable modem, WiMAX router, etc.) to couple to the wireless service provider's network (e.g., utilizing an IP address of the provider's Internet gateway). In other aspects, network interface 110 can comprise a cellular terminal module (not depicted) configured to wirelessly transmit on an UL channel and receive and decode wireless transmissions on a DL channel of a macro air interface associated with the wireless service provider's network. The cellular terminal module can enable HNB 100 to communicate with a nearby macro BS, for instance, and employ the macro BS as a gateway to the wireless service provider's network. In this latter aspect, HNB 100 can behave in a similar fashion as a wireless relay station (e.g., communicating with a macro BS and a UE on licensed frequencies). In at least one additional aspect, the cellular terminal module can enable HNB 100 to communicate wirelessly with other HNBs (not depicted). Using the cellular terminal module, HNB 100 can form a wireless backhaul link with other HNBs or a macro network BS. Alternatively, network interface 110 can comprise a wired backhaul connection between one or more other BSs, such as the macro network BS, or the other HNBs. This backhaul connection, whether wired or wireless, facilitates inter-BS communication directly from one BS (e.g., HNB 100) to another.

Further to the above, assisted access apparatus 102 comprises memory 108 for storing instructions configured for network-assisted cell acquisition, and a data processor 106 for executing modules to implement the instructions. HNB 100 can receive an access probe by a remote access terminal (a remote AT—not depicted). Upon receiving the access probe, data processor 106 executes a reference module 112 that accesses a closed subscriber group (a CSG) and identifies the network access probe as originating from a member or a non-member of the CSG. The CSG can be stored in memory 108, and can comprise a list, look-up table, or the like, identifying ATs that are a member of the CSG of HNB 100. Particularly, the CSG can comprise unique or pseudo-unique information for ATs that are members of the CSG, to distinguish these ATs from ATs that are non-members of the CSG. This information can include a subscriber identity module (SIM), international mobile equipment ID (IMEI), media access control address (MAC address), or the like, or a suitable combination thereof.

If the access probe is submitted by a terminal (a requesting access terminal—or requesting AT) that is a member of the CSG, HNB 100 can respond to the service probe, providing wireless voice or data services to the AT. If reference module 114 determines that the requesting AT is a non-member of the CSG, access to voice or data services is denied to the AT. In some circumstances, this can result in failure for the AT to acquire a serving network. For instance, CSG transceiver 104 can become a dominant interferer for the AT, especially when the AT is very close to the CSG transceiver 104, or very far from a neighboring macro BS. In this case, the AT may fail to acquire the macro BS, resulting in no cellular service.

To alleviate the foregoing problems, assisted access apparatus 102 can comprise a limited access module 114 that provides limited service for network access in response to a network access probe. This limited service can be granted if reference module 112 identifies the network access probe as originating from a requesting AT that is a non-member of the CSG. The limited service can be employed to assist the requesting AT in acquiring a signal of another BS or of another wireless network. In at least one example, the limited service can be configured to assist the requesting AT in acquiring a signal of a general access macro BS. In another instance, the limited service can be configured to assist the requesting AT in acquiring a signal of another HNB (e.g., which the requesting AT is included in a CSG). In at least one aspect of the subject disclosure, if reference module 112 identifies a requesting AT as a non-member of the CSG, limited access module 114 can identify a service provider of the requesting AT (e.g., by referencing a mobile ID database, by forwarding the ID to a cellular network, by inferring the service provider from a licensed frequency band over which the access probe is received, and so on). Upon identifying the service provider, limited access module 114 forwards the network access probe to a communication network of the service provider via network interface 110 (e.g., over the Internet). Assisted access apparatus 102 can then function as a proxy for the service provider's network, relaying communication between the requesting AT and the service provider's network, and assisting the requesting AT to acquire a signal of wireless infrastructure of the service provider's network.

By acting as a proxy for a general access network or another service provider, HNB 100 can preserve limited access constraints of the HNB 100, while mitigating effects of cell noise or interference caused by CSG transceiver 104. This functionality can help alleviate complexities caused by the semi-planned or unplanned deployment of typical subscriber-deployed access points/transmitters like HNB 100. As is described in more detail herein, an HNB such as HNB 100 can provide limited service for network access that includes providing signal acquisition information for one or more BSs neighboring HNB 100, relaying AT DL signal measurements to a service provider's network or to the neighboring BSs, negotiate signal resources with one or more of the neighboring BSs, and then transmit with reduced power or blank transmissions on reserved signal resources, to mitigate interference to the requesting AT, and so on.

Figure 2:
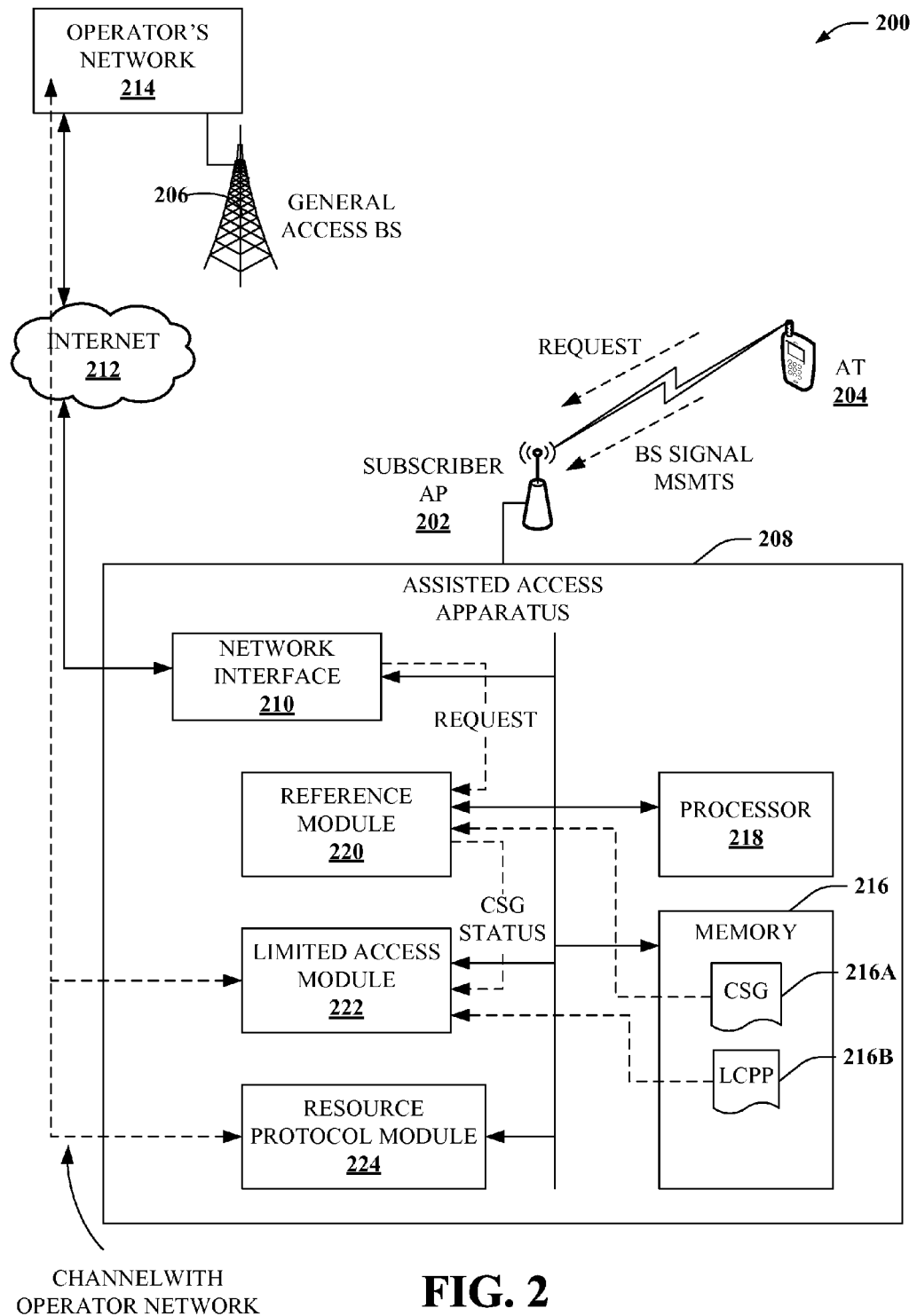
FIG. 2 depicts a block diagram of an example wireless communication environment for providing limited device access for network acquisition assistance.

FIG. 2 illustrates a block diagram of an example wireless communication system 200 according to particular aspects of the subject disclosure. Wireless communication system 200 can facilitate improved communication in semi-planned and unplanned wireless deployments. Particularly, for network deployments comprising CSG BSs (e.g., an HNB, HeNB, Femto cell, subscriber-deployed BS, etc.), wireless communication system 200 can facilitate limited access to CSG BSs according to a modified network protocol. This modified network protocol can be configured to preserve restricted access functionality of CSG BSs, while mitigating loss of service conditions that an AT can observe as a result of interference or noise caused by the CSG BSs.

Wireless communication system 200 comprises a subscriber access point (a subscriber AP) 202 and an AT 204. AT 204 can perform a network access probe (e.g., a random access channel [RACH] request) to obtain wireless service from subscriber AP 202 if, for instance, a pilot or synchronization signal of subscriber AP 202 has highest received energy at AT 204. The network access probe is provided to an assisted access apparatus 208 included within, or communicatively coupled with, subscriber AP 202. In at least one aspect of the subject disclosure, assisted access apparatus 208 can be substantially similar to assisted access apparatus 102 of FIG. 1, supra. However, the subject disclosure is not limited to this aspect(s).

According to one or more particular aspects of the subject innovation, assisted access apparatus 208 can comprise a network interface 210 (e.g., a wired or wireless communication interface) that receives and decodes the network access probe transmitted by AT 204. Particularly, network interface 210 can comprise a transmit-receive chain for wireless communication, or can be communicatively coupled with a transmit-receive chain of subscriber AP 202. Furthermore, network interface 210 can include a wired communication interface for exchanging electronic communication according to a wired communication protocol (e.g., transport control protocol/Internet protocol [TCP/IP], or another suitable wired communication protocol). In some aspects, the wired communication interface can comprise a broadband connection to the Internet 212, such as a digital subscriber line (DSL) connection, cable modem connection, broadband over power line connection. In at least one aspect, this broadband connection can also at least, in part, include a wireless communication, such as WiFi, wireless interoperability for microwave access (WiMAX), optical laser data communication, or other suitable broadband electronic or data communication mechanism.

Once connected to Internet 212, assisted access apparatus 208 can register with, or otherwise communicate with, a wireless operator's network 214. Thus, in one aspect of the subject disclosure, assisted access apparatus 208 can communicate with neighboring general access BSs 206 via wireless operator's network 214. In other aspects, network interface 210 can comprise protocols for receiving on a DL and transmitting on an UL, to communicate with neighboring general access BS 206 over-the-air. In at least one aspect, assisted access apparatus 208 can communicate with surrounding BSs via a plurality of wired or wireless techniques.

Network interface 210 forwards a received network access probe to reference module 220, which accesses a CSG 216A stored in a memory 216 of assisted access apparatus 208. Reference module 220 is executed by a data processor 218 to compare the network access probe to CSG 216A, and determine whether AT 204 is included within CSG 216A. If so, assisted access apparatus 208 approves network access for AT 204 via subscriber AP 202. Otherwise, reference module 220 forwards a CSG status (e.g. indicating AT 204 is a non-member of CSG 216A) of AT 204 to a limited access module 222 that employs a limited control plane protocol 216B stored in memory 216 to provide network acquisition assistance for AT 204. Particularly, this limited control plane protocol 216B can exclude AT 204 from resources of subscriber AP 202 in conjunction with voice or data services, local network access, Internet access, or the like. Additionally, limited control plane protocol 216B can provide instructions for communication with neighboring general access BS 206 or wireless operator's network 214 to facilitate signal acquisition or network access to neighboring general access BS 206, as is described in more detail below.

If AT 204 is determined to be a non-member of CSG 216A, limited access module 222 can forward the network access probe (or, e.g., an ID of AT 204 extracted from the network access probe) to wireless operator's network 214 or neighboring general access BS 206. According to one aspect of the subject disclosure, assisted access apparatus 208 can identify a service provider of AT 204 and forward the network access probe to a network of the service provider (e.g., wireless operator's network 214). If access is rejected, limited access module 222 obtains a network refusal from neighboring general access BS 206 or the service provider, and forwards the network refusal to AT 204. Assisted access apparatus 208 can then terminate wireless communication with AT 204. If network access is accepted, assisted access apparatus 208 can assist AT 204 in acquiring a signal of neighboring general access BS 206.

To aid AT 204 in acquiring another access point to wireless operator's network 214, assisted access apparatus 208 can obtain and forward signal acquisition information (e.g., cell ID, signal timing) of neighboring BSs to AT 204. In one aspect of the subject disclosure, assisted access apparatus 208 automatically obtains the neighboring BS information from a wireless service provider upon registering with the wireless service provider. In other aspects, this information can be obtained upon powering up and signaling one or more service provider gateways to request such information. Once received, the information can be stored in memory 216 and forwarded to ATs determined to be non-members of CSG 216A. In alternative aspects, the neighboring BS information can be received from a service provider network in response to forwarding a network access probe submitted by AT 204, or data extracted there from, to the service provider gateway. In at least one aspect, assisted access apparatus 208 can receive surrounding macro BS information in a combination of the foregoing manners.

Various signal acquisition information can be employed to assist AT 204 in identifying neighboring general access BS, and measuring DL signals thereof, or sending a network access probe thereto. In one instance, this information can comprise a cell ID or relative timing of neighboring general access BS 206. In another instance, limited access module 222 obtains a random access channel (a RACH) or a reserved random access channel sequence (a reserved RACH sequence) and forwards the RACH or the reserved RACH sequence to AT 204 to facilitate a limited access to neighboring general access BS 206. In a particular aspect, the reserved RACH sequence can be derived from a root sequence that is reserved for such communication.

Once received, AT 204 can utilize signal acquisition information to measure DL signals of neighboring general access BS 206. These measurements can in turn be uploaded to subscriber AP 204. In response, limited access module 222 decodes a relative signal strength measurement (or set of such measurements) of the neighboring BSs received from AT 204, and network interface 210 submits the measurements to a service provider network associated with AT 204 (e.g., wireless operator's network 214). The service provider network can employ these measurements to select a serving BS for AT 204, from a set of candidate BSs (e.g., comprising the neighboring BSs).

If neighboring general access BS 206 is selected to be a serving BS for AT 204, assisted access apparatus 208 can be configured to reduce interference for communication between the serving BS and AT 204. As an example, assisted access apparatus 208 can comprise a resource protocol module 224 that negotiates wireless resources to be reserved for this communication. Particularly, resource protocol module 224 can dynamically negotiate with neighboring general access BS 206 to establish these wireless resources, obtain the wireless resources from wireless operator's network 214 (e.g., negotiated by the network), or store a default set of wireless resources for this communication in memory 216. Once obtained or established, subscriber AP 202 can then transmit at reduced power on these wireless resources, or can blank transmission on these wireless resources entirely. In this manner, communication between the AT 204 and neighboring general access BS 206 can be effected even where subscriber AP 202 is a dominant interferer for AT 204.

Figure 3:
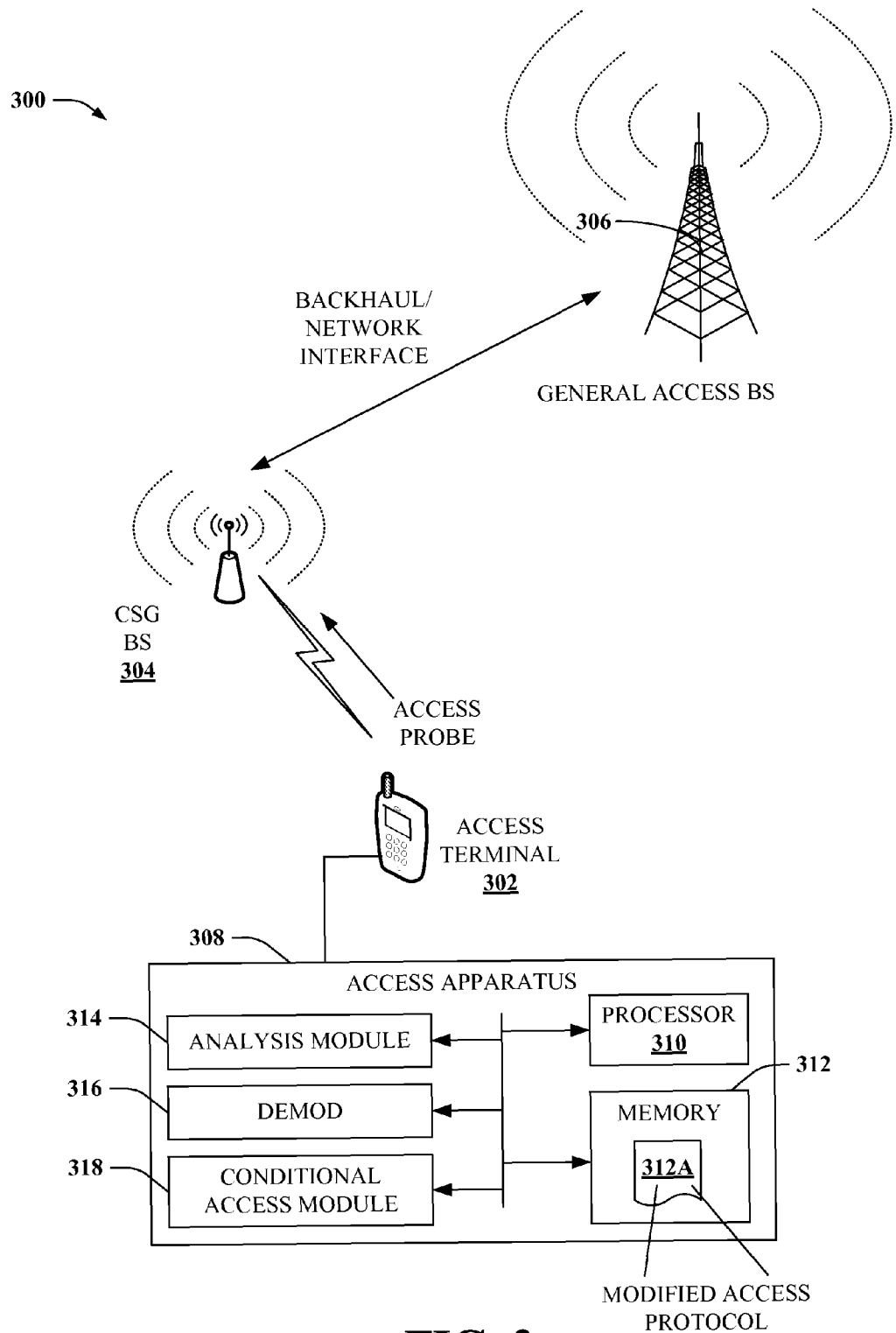
FIG. 3 illustrates a block diagram of an example access terminal configured to obtain limited network access according to further disclosed aspects.

FIG. 3 illustrates a block diagram of an example system 300 for improved wireless access in a heterogeneous wireless access point environment. System 300 comprises an AT 302 in close proximity to a CSG BS 304. Furthermore, system 300 comprises a general access BS 306 that is a large distance from both the CSG BS 304 and AT 302. Accordingly, AT 302 observed signals of CSG BS 304 at much greater amplitude than signals of general access BS 306. Where this amplitude disparity is great, CSG BS 304 can jam or interfere with wireless communications of AT 302, reducing probability of communication between AT 302 and general access BS 306. Accordingly, CSG BS 304 becomes a dominant interferer as observed at AT 302.

If AT 302 is a member of a CSG of CSG BS 304, wireless services can be obtained from CSG BS 304, and the signal disparity is not a problem in obtaining network access. However, where AT 302 is a non-member of the CSG (e.g., AT 302 is not recognized by or not authorized to access CSG BS 304), AT 302 can fail to obtain wireless services altogether, due to the interference caused by CSG BS 304.

To alleviate the dominant interference scenario, AT 302 comprises an access apparatus 308 configured to acquire limited access to the CSG BS 304, for purposes of network-assisted acquisition. Typically, AT 302 scans received wireless signals, and attempts to decode the received signals. Decoding involves identifying a pilot or synchronization pulse and deriving precise timing information for the pulse. This timing information can then be employed to interpret other information transmitted on the received signals. Where signal to noise ratio (SNR) is high, however, AT 302 may not be able to successfully derive this timing information. In such case, further communication is limited or non-existent. Accordingly, access apparatus 302 can be configured to obtain limited access to CSG BS 304, to obtain ID and timing information for nearby macro BSs (e.g., general access BS 306). Once the timing information is acquired, AT 302 can more readily identify and decode signals transmitted by these nearby macro BSs. In this way, CSG BS 304 can assist AT 302 in acquiring nearby general access BSs, without allocating significant processing or bandwidth resources to non-CSG members, or by providing such resources for a limited time.

Access apparatus 308 comprises a memory 312 for storing instructions configured to obtain limited network access upon a failed access request, and a data processor 310 that executes modules to implement the instructions. Particularly, data processor 310 can execute an analysis module 314 that determines whether a network access procedure performed by access apparatus 308 fails (e.g., if an access request times out, or is rejected by CSG BS 304). If the network access procedure fails, data processor 310 can execute a demodulator 316 that identifies a dominant interferer, and decodes a signal of the dominant interferer. In this case, the dominant interferer is CSG BS 304, due to the proximity of AT 302 and CSG BS 304, compared with general access BS 306. Once the signal of the dominant interferer is identified and decoded, data processor 310 can execute a conditional access module 318 to employ the decoded signals and sends an access probe to the dominant interferer (e.g., CSG BS 304) according to a modified access protocol 312A stored in memory 312.

Modified access protocol 312A can be configured to facilitate network access assistance from suitably configured CSG access points (e.g., subscriber AP 202 of FIG. 2, supra). Utilizing this modified access protocol 312A, AT 302 can obtain signal acquisition information pertaining to a surrounding macro network, including general access BS 306. In some aspects, the signal acquisition information includes a list of cell IDs for surrounding BSs, enabling AT 302 to identify received signals and associate the signals with respective network cells. In another aspect, the signal acquisition information can include relative timing of respective BS signals, to assist AT 302 in proper signal decoding. In an alternative or additional aspect, the signal acquisition information can include a RACH, or a reserved RACH sequence, or the like, employed by one or more BSs of the surrounding macro network.

Figure 4:
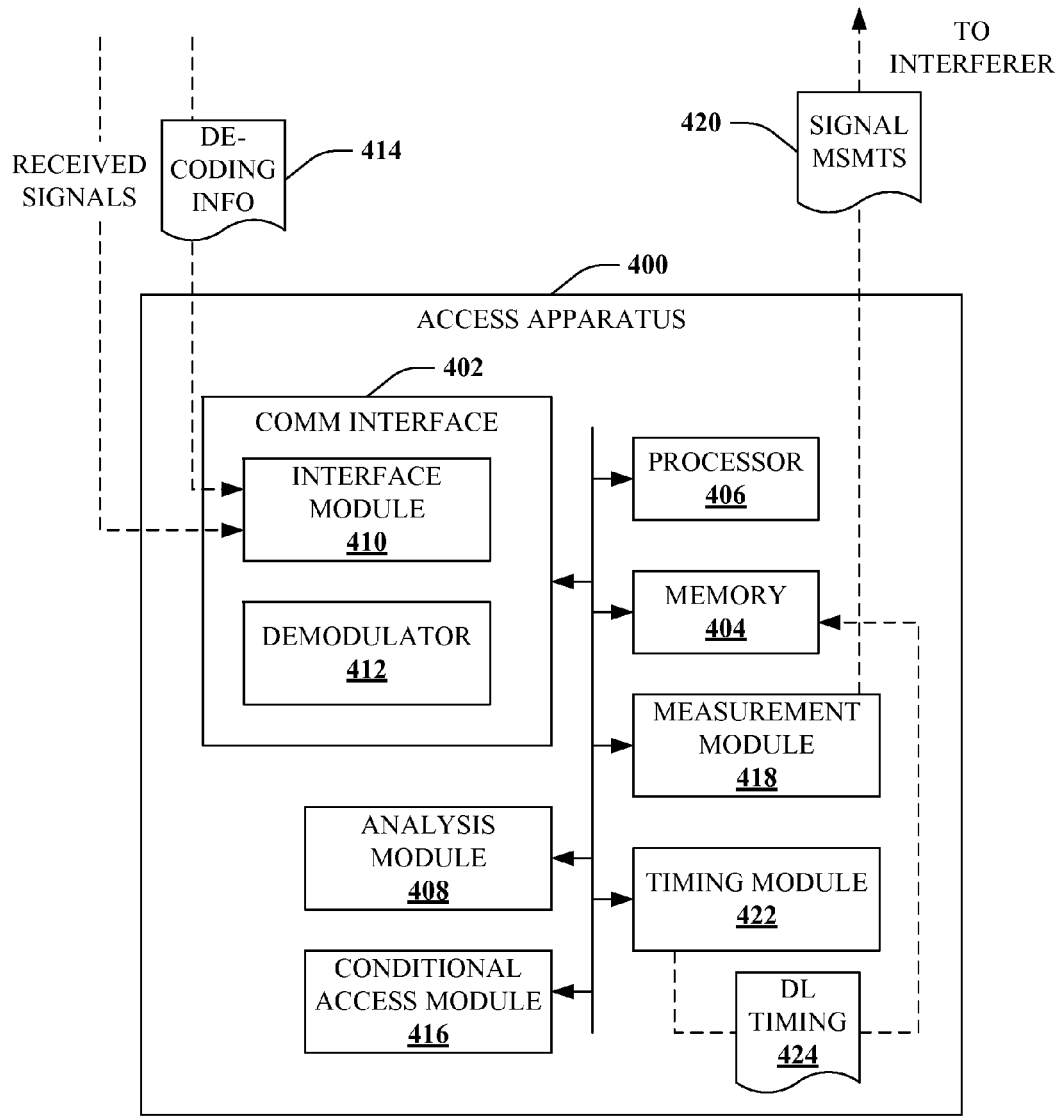
FIG. 4 illustrates a block diagram of a sample access apparatus for requesting network access assistance according to one or more aspects.

FIG. 4 illustrates a block diagram of an example access apparatus 400 according to one or more particular disclosed aspects. In at least one aspect, access apparatus 400 can be substantially similar to access apparatus 308 of FIG. 3, supra. However, the subject disclosure is not so limited. For instance, access apparatus 400 can include some, all or none of the features of access apparatus 308, while including additional features described below. Although not depicted, access apparatus 400 can be included as part of an AT, either in software, hardware, or firmware, or a suitable combination thereof.

Access apparatus 400 comprises a communication interface 402 for transmitting and receiving wireless signals. In one aspect of the subject disclosure, communication interface 402 can comprise a transmit-receive chain of an AT of which access apparatus 400 is a part. In another aspect, communication interface 402 can be configured to electronically communicate with the transmit-receive chain, thereby employing it to transmit and receive the wireless signals.

Access apparatus 400 can form a wireless link with an access point of a wireless network by employing a data processor 406 to execute network protocols (not depicted) stored in memory 404. The wireless link can comprise sending a network access probe over a RACH employed by such an access point. If the network access probe is approved, a response is transmitted to access apparatus 400 to facilitate a direct wireless channel there with. Additionally, in conjunction with sending the network access probe, data processor 406 can execute an analysis module 408 to determine whether the network access probe fails, or is rejected by the access point. In this latter case, demodulator 412 identifies and decodes a signal of a dominant interferer and a conditional access module 416 employs a modified access protocol (not depicted, but see modified access protocol 312A of FIG. 3, supra) to request limited network acquisition assistance from the dominant interferer.

After submitting the request for limited network acquisition assistance, data processor 406 can execute an interface module 410 to monitor DL channels to determine whether the request is approved. If approval is obtained, interface module 410 obtains decoding information 414 over the DL channels from the dominant interferer for a set of general access base stations (a set of general access BSs) neighboring the dominant interferer. Particularly, the decoding information 414 can comprise a set of cell ID(s) of neighboring general access BSs, relative timing information of such BSs, system information block (SIB) data (e.g., RACH parameters such as a RACH sequence, or other SIB information), or the like, or a combination thereof. This decoding information 414 can be utilized to assist access apparatus 400 to identify and acquire received energy samples for pilot or synchronization signals of at least a subset of the set of general access BSs, while filtering signals of the dominant interferer, for instance. Once the received energy samples are acquired, a measurement module 418 can be employed that calculates relative strength of the pilot or synchronization signals of a subset of the set of general access BSs. Measurement module 418 then reports the relative strength in a signal measurements message 420 to the dominant interferer via interface module 410 and communication interface 402.

In response to the relative strength information, a wireless network can select one BS of the set of general access BSs to serve an AT associated with access apparatus 400. This selection is sent to the dominant interferer, which acts as a proxy for the wireless network and forwards signal acquisition information (e.g., cell ID and relative timing data) of the serving BS to the AT. The signal acquisition information is selected to assist the AT in acquiring the serving BS, and can include one or more sets of suitable information. In one example, interface module 410 obtains a cell ID and relative timing of the serving BS from the signal acquisition information. Utilizing the cell ID and relative timing, demodulator 412 attempts to identify and decode a pilot of the serving BS. If the pilot is successfully decoded, access apparatus 400 can monitor system information block (SIB) data to identify RACH resources, whereupon conditional access module 416 transmits a network access probe to the serving BS. As one alternative to the foregoing, interface module 410 obtains relative timing delay and SIB information of the serving BS from the signal acquisition information instead. This can be utilized to transmit a network access probe directly, and obviate pilot signal acquisition. As yet another alternative example, the dominant interferer can directly forward a RACH, or a reserved RACH sequence, etc., to the AT. In this case, conditional access module 416 can employ the RACH or reserved RACH sequence to transmit a network access probe to the serving BS, enabling access apparatus 400 to avoid pilot signal acquisition.

If the network access probe is successfully received by the serving BS, access apparatus 400 optionally obtains a RACH acknowledgment comprising a terminal ID and an advanced timing command in response to the network access probe. The terminal ID can be some unique or pseudo-unique code associated with the AT, and can be employed to establish a wireless communication link between the serving BS and the AT (e.g., a unicast channel). Additionally, access apparatus 400 can comprise a timing synchronization module 422 that refines DL signal timing 424 with the advanced timing command and stores DL signal timing 424 in memory 404. Once signal timing is properly acquired, access apparatus 400 registers with the serving BS (e.g., optionally within a time specified in the RACH acknowledgment), and can terminate communication with the dominant interferer.

Figure 5:
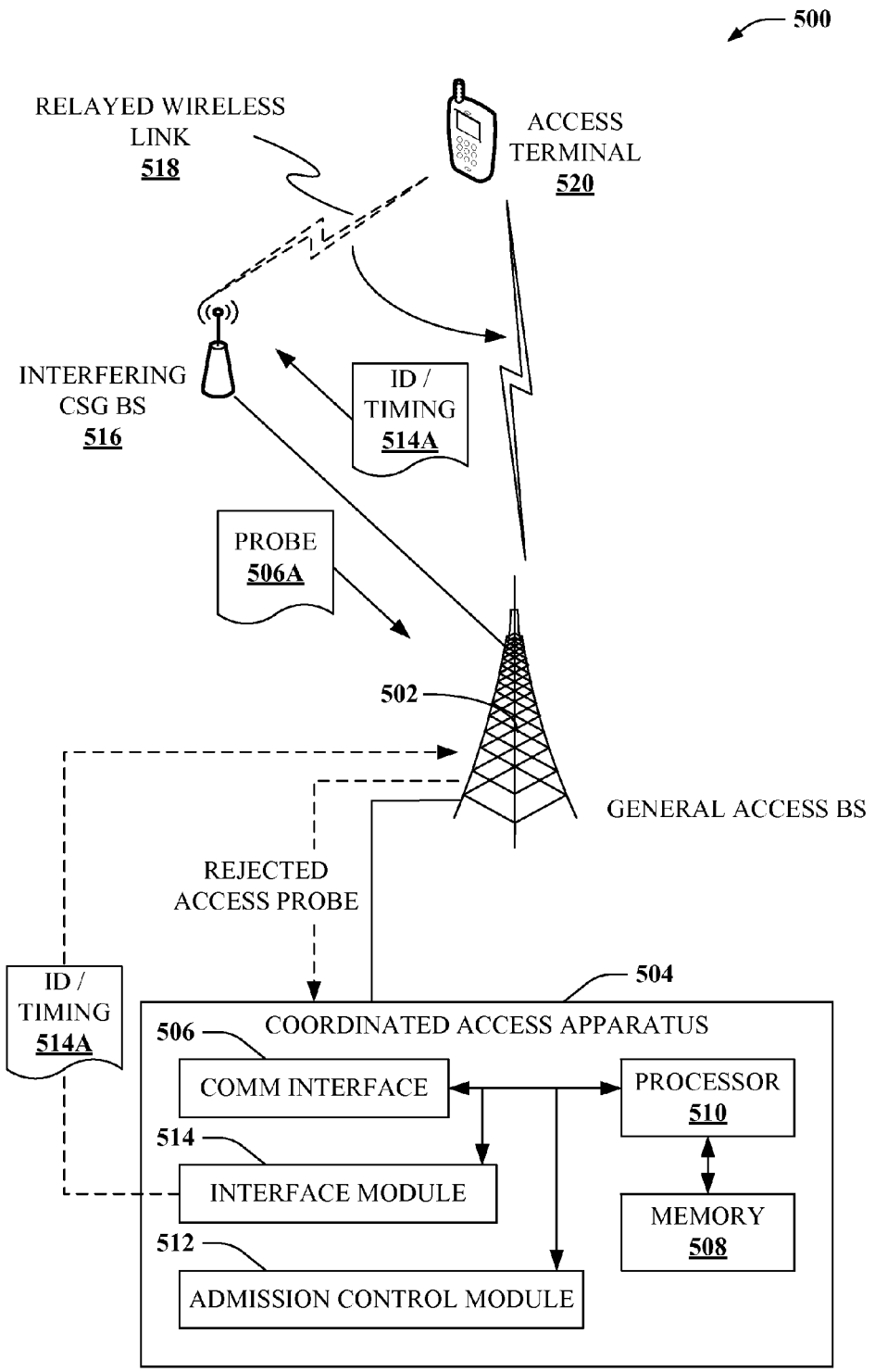
FIG. 5 illustrates a block diagram of a sample wireless communication environment to facilitate network access via a proxy access point in other aspects.

FIG. 5 depicts a block diagram of a sample wireless communication environment 500 according to additional aspects of the subject disclosure. Wireless communication environment 500 comprises a semi-planned deployment of network access points, including a planned deployment of general access BSs (e.g., comprising at least one general access BS 502), and an unplanned deployment of subscriber-deployed CSG BSs (e.g., comprising at least one interfering CSG BS 516). In circumstances where an AT 520 observes significant interference from interfering CSG BS 516, AT 520 might not be able to properly receive or decode a pilot signal of general access BS 502. To further compound this problem, if AT 520 is not within a CSG of interfering CSG BS 516, a loss of wireless service can result. To mitigate service loss, general access BS 502 can comprise a coordinated access apparatus 504 that employs interfering CSG BS 516 as a proxy to assist at least with initial communication between AT 520 and general access BS 502. To this end, coordinated access apparatus 504 can communicate directly with interfering CSG BS 516, or can communicate indirectly there with via a wireless network that the interfering CSG BS is registered with. In at least one particular aspect, coordinated access apparatus 504 can also negotiate or establish resources to be reserved temporarily by interfering CSG BS 516. As a result, communication between AT 520 and general access BS 502 can observe lower or no interference from interfering CSG BS 516, at least on these reserved resources. Accordingly, coordinated access apparatus 504 can mitigate loss of service for AT 520, improving communication in general for wireless communication environment 500.

To communicate with another BS, coordinated access apparatus 504 can comprise a communication interface 506 for wired or wireless communication with neighboring BSs. Communication interface 506 can employ a wired communication link, such as a backhaul network coupling general access BS 502 with one or more of the neighboring BSs, or a wireless communication link with suitably configured neighboring BSs, (e.g., where interfering CSG BS 516 comprises protocols for receiving signals from general access BS 502 on a DL, and transmitting signals to general access BS 502 on an UL). In at least one instance, communication interface 506 can employ a link with a wireless operator's network on which interfering CSG BS 516 is registered. As utilized herein, a neighboring BS can comprise a BS that is within or substantially within a signal range of general access BS 502. It should be appreciated that in at least some aspects of the subject disclosure, the term 'neighboring' can have a different scope than is implied by this definition, however. For instance, a neighboring BS can instead comprise BSs that are controlled by a common base station controller, BSs that are coupled by a backhaul network, or another suitable definition.

In operation, communication interface 506 obtains a network access probe 506A relayed to general access BS 502 from a neighboring CSG BS (e.g., interfering CSG BS 516). Particularly, network access probe 506A can comprise a network access request transmitted by an AT 520 to interfering CSG BS 516. If network access probe 506A is denied by interfering CSG BS 516, AT 520 will not be able to obtain wireless service at interfering CSG BS 516. As described herein, failure to obtain wireless service at interfering CSG BS 516 can lead to loss of service for AT 502, especially where transmissions of interfering CSG BS 516 are of substantially greater strength than that of a surrounding macro network (e.g., including general access BS 502). Additionally, coordinated access apparatus 504 comprises memory 508 that stores instructions configured to employ the neighboring CSG BS for access assistance to general access BS 502, and a data processor 510 that executes modules to implement these instructions. In one example, this network access assistance can employ interfering CSG BS 516 as a proxy for general access BS 502, based on a limited control plane protocol (e.g., employing broadcast channels) between AT 520 and interfering CSG BS 516.

To facilitate assisted access, coordinated access apparatus 504 can comprise an admission control module 512 employed to determine whether general access BS 502 is to be a serving BS for the AT transmitting network access probe 506A. This determination can first be based on whether AT 520 is authorized to obtain wireless service from general access BS 502 (e.g., based on a subscriber list maintained by a wireless network associated with general access BS 502), and optionally based on whether general access BS 502 is a preferred wireless access point for AT 520. Identifying the preferred wireless access point can comprise receiving DL signal measurements of a surrounding macro network performed by AT 520, which are forwarded to general access BS 502 via interfering CSG BS 516. If admission control module 512 determines that AT 520 is authorized for network access, and optionally if general access BS 502 is selected as the serving BS, coordinated access apparatus 504 can employ an interface module 514 that forwards a cell ID and timing information 514A of general access BS 502 via the neighboring CSG BS to AT 520. This cell ID and timing information can be utilized by AT 520 in relaying a wireless link 518 between AT 520 and interfering CSG BS 516, to general access BS 502, instead. This facilitates communication with general access BS 502, even if AT 520 is unable to properly decode a pilot of general access BS 502 to obtain this information directly. In at least one aspect, however, coordinated access apparatus 504 can negotiate reserved RACH resources for communication between AT 520 and general access BS 502, further mitigating or even avoiding interference from interfering CSG BS 516. In this latter aspect(s), AT 520 can submit a network access probe to general access BS 502 utilizing the reserved RACH resources. This aspect(s) is described in further detail at FIG. 6, infra.

Figure 6:
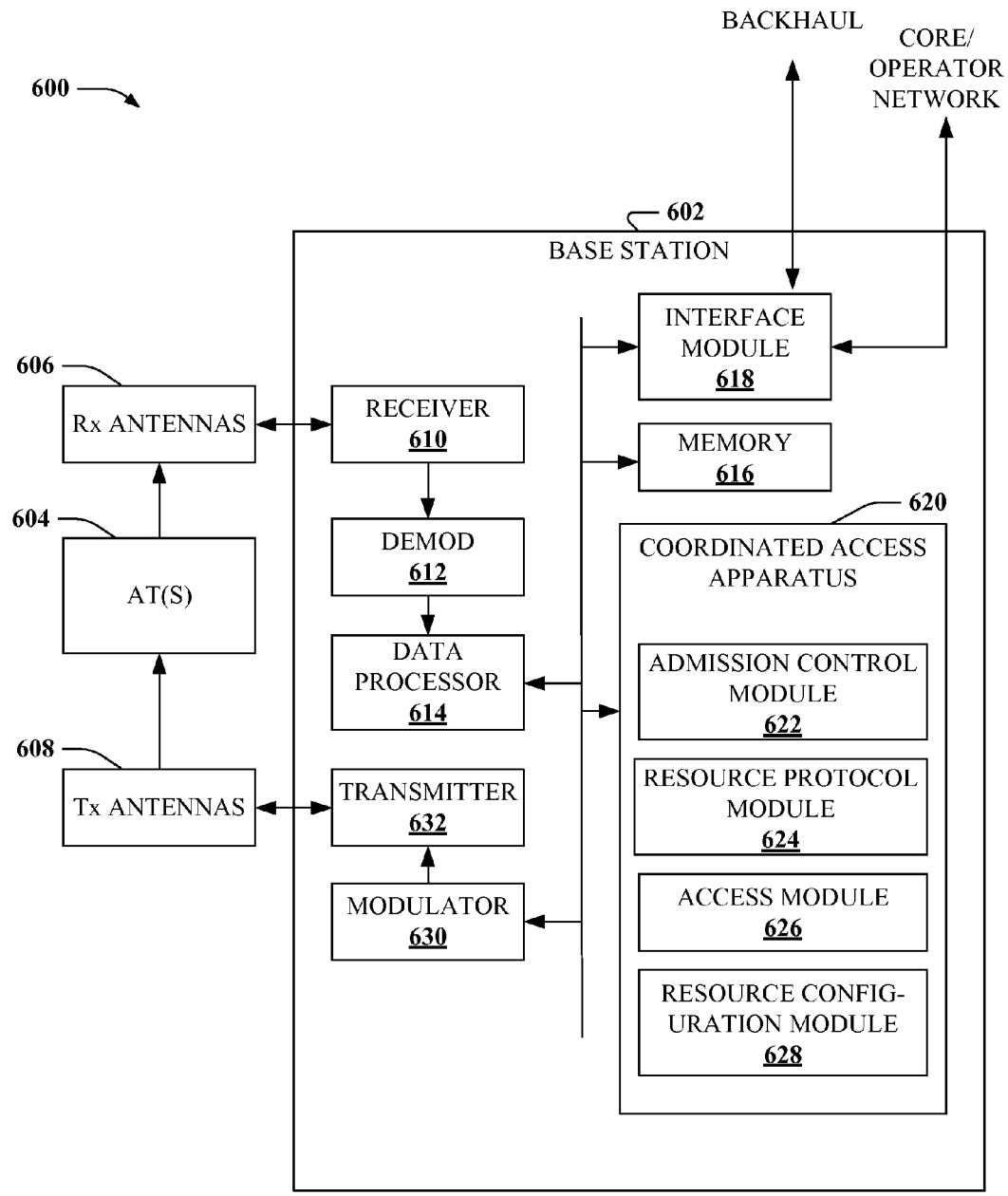
FIG. 6 depicts a block diagram of a sample general access base station according to still other aspects.

FIG. 6 illustrates a block diagram of an example system 600 comprising a BS 602 configured for aspects of the subject disclosure. For instance, BS 602 can be configured to provide assisted cell acquisition for one or more ATs 604 within a semi-planned BS deployment. In at least one example, BS 602 is configured to receive a rejected network access probe from a CSG BS, and route acquisition information to a requesting AT via the CSG BS. Additionally, BS 602 can be configured to negotiate reserved resources with the CSG BS to mitigate interference observed at the requesting AT. Accordingly, BS 602 can be configured to provide improved cell acquisition even in adverse heterogeneous wireless environments.

BS 602 (e.g., access point, . . . ) can comprise a receiver 610 that obtains wireless signals from one or more of ATs 604 through one or more receive antennas 606, and a transmitter 632 that sends coded/modulated wireless signals provided by modulator 630 to the AT(s) 604 through a transmit antenna(s) 608. Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by BS 602. In one instance, stored information can comprise communication protocols for communication with CSG BSs (e.g., over a wired or wireless backhaul network). In other aspects, stored information can comprise protocols for forwarding acquisition and timing information to a requesting AT via the CSG BS. In addition to the foregoing, memory 616 can comprise rules or protocols for negotiating reserved resources for wireless communication, as described herein.

BS 602 can comprise an interface module 618 that can couple with external network entities. In one aspect, the external network entity can comprise a wireless service operator's network. In another aspect, the external entity can comprise a wireless network access point, such as a HNB. According to this latter aspect, interface module 618 can be employed to receive notice of a failed access attempt transmitted to the HNB if, for instance, a requesting AT is a non-member of a CSG associated with the HNB. BS 602 can further comprise a coordinated access apparatus 620 that can be configured to move or route the requesting AT to a general access BS, such as BS 602.

Further to the above, coordinated access apparatus 620 comprises an admission control module 622 that determines whether BS 602 can authorize service for the requesting AT, and determine whether BS 602 is suitable to serve the AT. If so, BS 602 forwards a cell ID and timing information of BS signals to the AT. In some aspects, the cell ID and timing information is routed through the CSG BS via interface module 618. In other aspects, the cell ID and timing information is transmitted over-the-air via transmitter 632 and transmit antenna(s) 608.

Further to the above, coordinated access apparatus 620 can comprise a resource protocol module 624 that negotiates reserved resources for communication between the AT and BS 602. Resource protocol module 624 can be executed if the AT observes significant interference from the CSG BS, for instance. Suitable resources can include a RACH, a reserved RACH sequence (optionally derived from a reserved root sequence), reserved frequency sub-band, reserved interlace, reserved timeslot or subframe, a set of time-frequency resources (e.g., orthogonal frequency division multiplex [OFDM] symbols) or the like. Thus, in one instance, resource protocol module 624 allocates a reserved RACH sequence to the AT. According to a particular aspect, the reserved RACH sequence is generated from a root sequence reserved for the AT, or reserved for access communication with BS 602.

Once established, the reserved resources are forwarded to the AT, and an access module 626 monitors the reserved resources for a modified protocol access probe from the AT. Once received, access module 626 decodes the modified protocol access probe. As an illustrative example where a reserved RACH is provided as the reserved resources, access module 626 monitors the reserved RACH and decodes the modified protocol access probe containing the reserved RACH sequence. In at least one aspect, the modified protocol access probe instructs the AT to submit an access probe on the reserved resources without directly acquiring a pilot of BS 602, for instance. Once decoded, access module 626 relays an advanced timing command to the AT in response to the modified protocol access probe. This advanced timing command can assist the AT in optimizing wireless communications with BS 602. For the reserved RACH example, access module 626 responds to the access probe transmitted on the reserved RACH with a RACH acknowledgment and the timing advanced command if the requesting AT is authorized to access BS 602 (e.g., as determined by admission control module 622).

In at least one aspect of the subject disclosure, reserved resources can be static, predetermined set of resources maintained by a resource configuration module 628. In this aspect(s), resource configuration module 628 employs the predetermined set of resources, which can be reserved for BS 602 by the neighboring CSG BS, for communication with the AT. In other aspects, the reserved resources can be dynamically negotiated by resource protocol module 624. Negotiations can be directly between the CSG BS and BS 602 (e.g., where a backhaul network exists between the base stations), or using a wireless operator's network, the Internet, or another suitable network as an intermediary, depending on a particular base station deployment.

Figure 7:
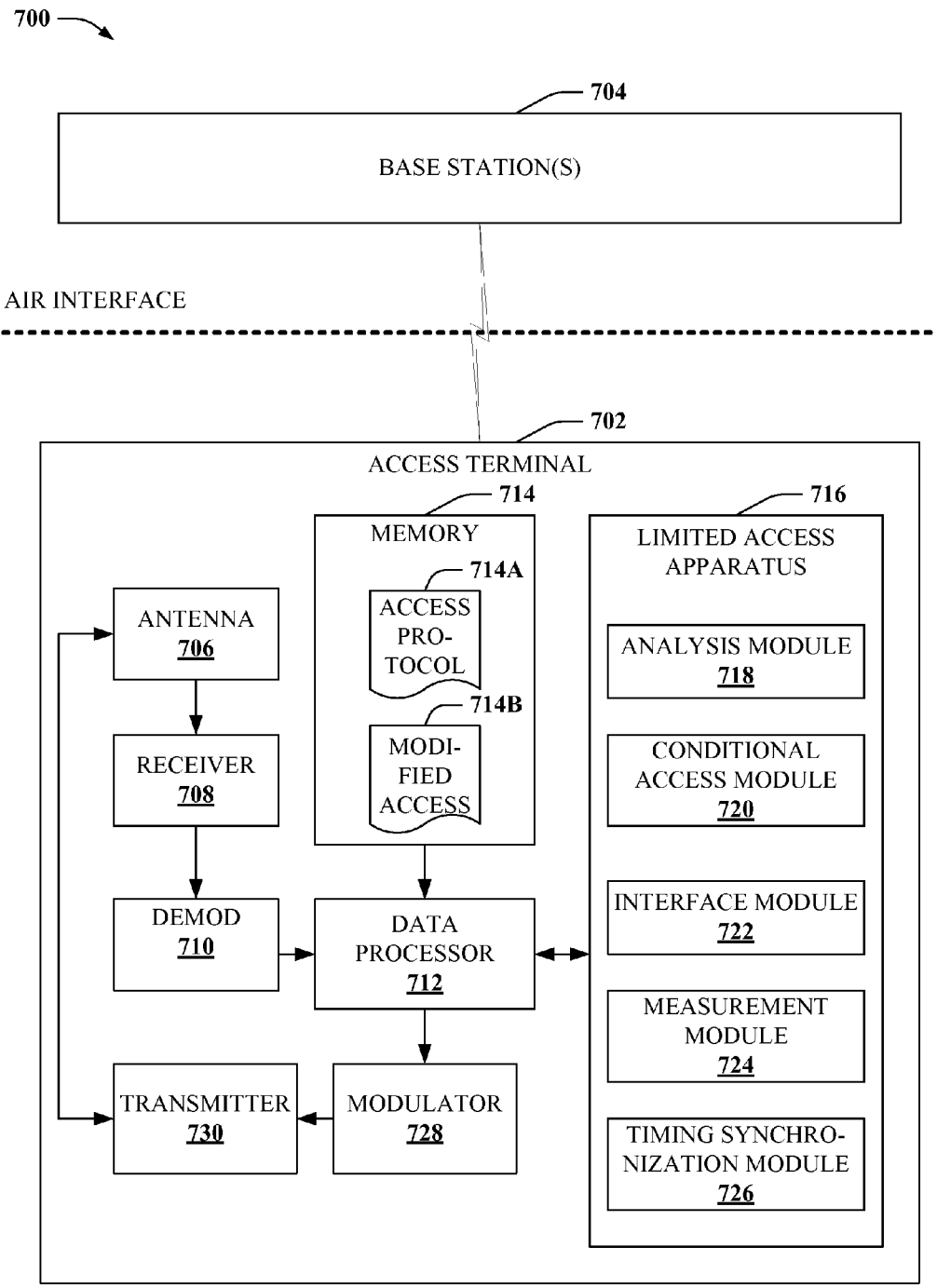
FIG. 7 depicts a block diagram of an example access terminal configured to request access according to a limited control plane protocol.

FIG. 7 illustrates a block diagram of an example wireless communication system 700 comprising an AT 702 according to one or more additional aspects of the subject disclosure. AT 702 can be configured to wirelessly communicate with one or more BSs 704 (e.g., access point(s)) of a wireless network. Based on such configuration, AT 702 can receive wireless signals from BS(s) 704 on one or more forward link channels and respond with wireless signals on one or more reverse link channels. In addition, AT 702 can comprise instructions stored in memory 714 for employing a modified access protocol 714B for obtaining limited access to BS(s) 704 for network acquisition, and a data processor 712 to implement these instructions. Particularly, the modified access protocol 714B can be employed if a conventional network access probe is rejected by BS(s) 704.

AT 702 includes at least one antenna 706 (e.g., comprising one or more input/output interfaces) that receives a signal and receiver(s) 708, which perform typical actions (e.g., filters, amplifies, down-converts, etc.) on the received signal. In general, antenna 706 and a transmitter 722 (collectively referred to as a transceiver) can be configured to facilitate wireless data exchange with base station(s) 704.

Antenna 706 and receiver(s) 708 can also be coupled with a demodulator 710 that can demodulate received symbols and provide demodulated symbols to a data processor(s) 712 for evaluation. It should be appreciated that data processor(s) 712 can control and/or reference one or more components (antenna 706, receiver 708, demodulator 710, memory 714, limited access apparatus 716, modulator 728, transmitter 730) of AT 702. Further, data processor(s) 712 can execute one or more modules, applications, engines, or the like that comprise information or controls pertinent to executing functions of AT 702.

Additionally, memory 714 of AT 702 is operatively coupled to data processor(s) 712. Memory 714 can store data to be transmitted, received, and the like, and instructions suitable to conduct wireless communication with a remote device (e.g., one or more of BS(s) 704). In addition, memory 714 can comprise an access protocol 714A employed to perform conventional network access requests to BS(s) 704. Additionally, memory 714 can comprise modified access protocol 714B to obtain limited access for network acquisition, if the convention network access request is rejected by BS(s) 704.

In operation, AT 702 can employ a limited access apparatus 716 to request network acquisition assistance where a conventional network access probe fails. Failure of the conventional network access probe can be a result of rejection by BS(s) 704, in one instance, or result from dominant interference from a HNB that causes significant interference to a surrounding macro network. Particularly, an analysis module 718 monitors signals received from BS(s) 704 and determines whether a network access procedure performed by AT 702 fails. In this case, demodulator 710 identifies a dominant interferer and decodes a signal of the dominant interferer, and a conditional access module 720 is executed that sends an access probe to the dominant interferer according to modified access protocol 714B.

In one aspect of the subject disclosure, an interface module 722 can be executed that obtains decoding information from the dominant interferer pertaining to a set of general access BSs (which can include, e.g., one or more of BS(s) 704). In at least one aspect, this decoding information is transmitted to AT 702 by the dominant interferer, in response to the access probe according to modified access protocol 714B. Utilizing the decoding information, receiver 708, demodulator 710 and data processor 712 can obtain respective signal energy samples for respective pilot or synchronization signals of at least a subset of the set of general access BSs. A measurement module 724 can then be employed that calculates a relative strength of the respective pilot or synchronization signals. AT 702 reports the relative strength measurements to the dominant interferer. In at least one aspect of the subject disclosure, a wireless network associated with the dominant interferer selects a serving BS for AT 702, based at least in part on the relative strength measurements. In this aspect(s), the dominant interferer, or another BS associated with the wireless network (e.g., one or more of BS(s) 704) forwards signal acquisition information (e.g., a cell ID, relative timing, or the like) of one of the set of general access BSs (a serving BS) selected to serve AT 702.

Upon receiving the signal acquisition information, conditional access module 720 transmits a network access probe to the serving BS. This conditional access probe can be pursuant to access protocol 714A, or modified access protocol 714B. In one instance, the signal acquisition information can specify what type of protocol should be employed by AT 702 to access the serving BS. In another aspect, the type of protocol can be conveyed via higher layer signaling, or can be part of a network specification stored in memory 714, or another suitable mechanism.

In addition to the foregoing, it should be appreciated that the signal acquisition information can include different types of data, and conditional access module 720 can respond depending on the type of data received. In one example, interface module 722 obtains relative timing delay and SIB information from the dominant interferer, which is extracted from the signal acquisition information. In this example, conditional access module employs this information to properly configure the network access probe. For instance, the SIB information might specify a set of reserved time-frequency resources employed by the serving BS to accept the network access probe. Further, signal timing for the network access probe can be configured utilizing the relative timing delay.

In another example, interface module 722 obtains a reserved RACH sequence employed by the serving BS from the signal acquisition information. This reserved RACH sequence can be derived from a root sequence reserved by the dominant interferer for the serving BS, however the subject disclosure is not limited to this implementation. Regardless of how the reserved RACH sequence is derived, conditional access module transmits the network access probe with the reserved RACH sequence, to be received by the serving BS.

If the network access probe is received by the serving BS, AT 702 obtains a RACH acknowledgment comprising a terminal ID (e.g., a unique or pseudo-unique identifier associated with AT 702) and an advanced timing command in response to the network access probe. A timing synchronization module 726 refines DL signal timing estimates with the advanced timing command, whereupon AT 702 registers with the serving BS within a time specified in the RACH acknowledgment. Further, the terminal ID can be employed to establish an orthogonal wireless link between the serving BS and AT 702 upon successful registration. This orthogonal wireless link can help to mitigate interference from the dominant interferer, improving communication quality.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 702, BS 602, and subscriber AP 202, or a different combination of these or other entities. Sub-modules could also be implemented as modules communicatively coupled to other modules rather than included within parent modules. Additionally, it should be noted that one or more modules could be combined into a single module providing aggregate functionality. For instance, analysis module 314 can include conditional access module 318, or vice versa, to facilitate identifying a failed access probe and performing a conditional access procedure to a general access BS by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-12. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
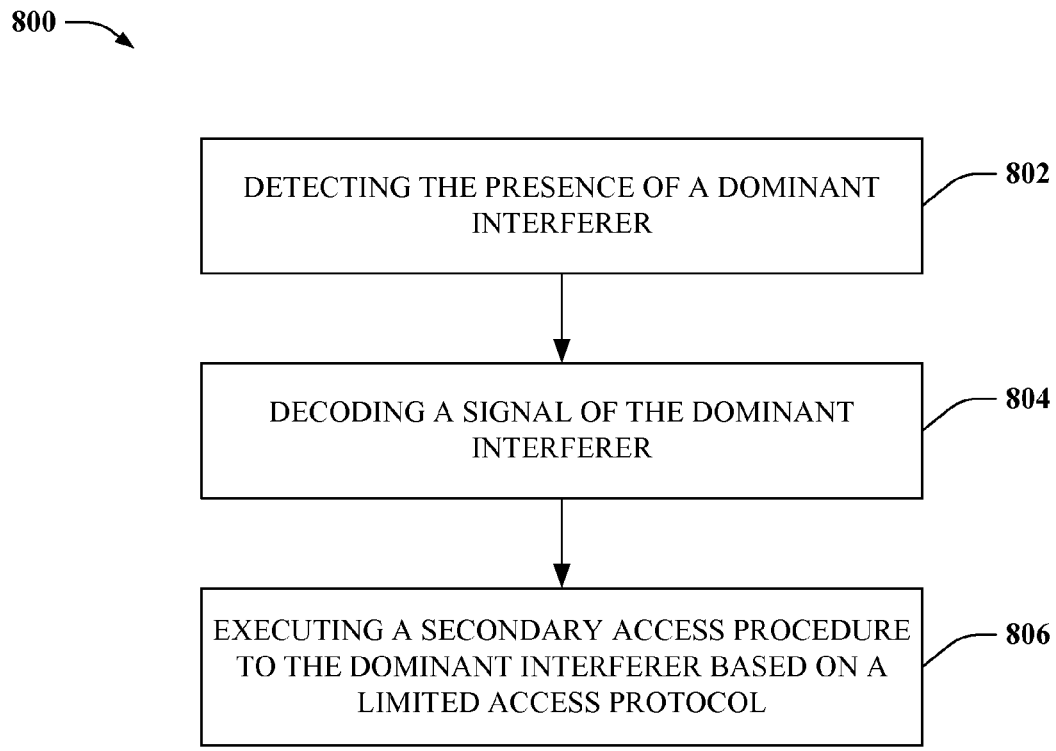
FIG. 8 depicts a flowchart of a sample methodology for acquiring limited network access in wireless communication according to particular aspects.

FIG. 8 depicts a flowchart of an example methodology 800 for acquiring wireless communication in a heterogeneous access point deployment according to aspects of the subject disclosure. At 802, method 800 can comprise detecting the presence of a dominant interferer and, at 804, method 800 can comprise decoding a signal of the dominant interferer. According to a particular aspect of the subject disclosure, detecting the presence of the dominant interferer can comprise performing a RACH procedure to obtain access to a wireless network and determining whether the RACH procedure succeeds or fails. This determination can be based on failure to receive a response to the RACH procedure, obtaining a rejection in response to the RACH procedure, or failing to decode a signal of a known BS in the presence of dominant interference, or a suitable combination thereof. If the RACH procedure fails, an inference can be drawn that the dominant interferer is present. At 806, method 800 can further comprise executing a secondary access procedure to the dominant interferer. In at least one disclosed aspect, the secondary access procedure can be in accordance with a limited access protocol (e.g., a limited control plane protocol) that governs network access for the heterogeneous access point deployment. Particularly, the limited access protocol can facilitate limited access to a HNB that is not configured to allow full network access to a requesting AT. This limited access, however, can be employed to assist the requesting AT in acquiring a signal, or otherwise successfully submitting an access probe, to another BS that can provide service to the requesting AT.

Figure 9:
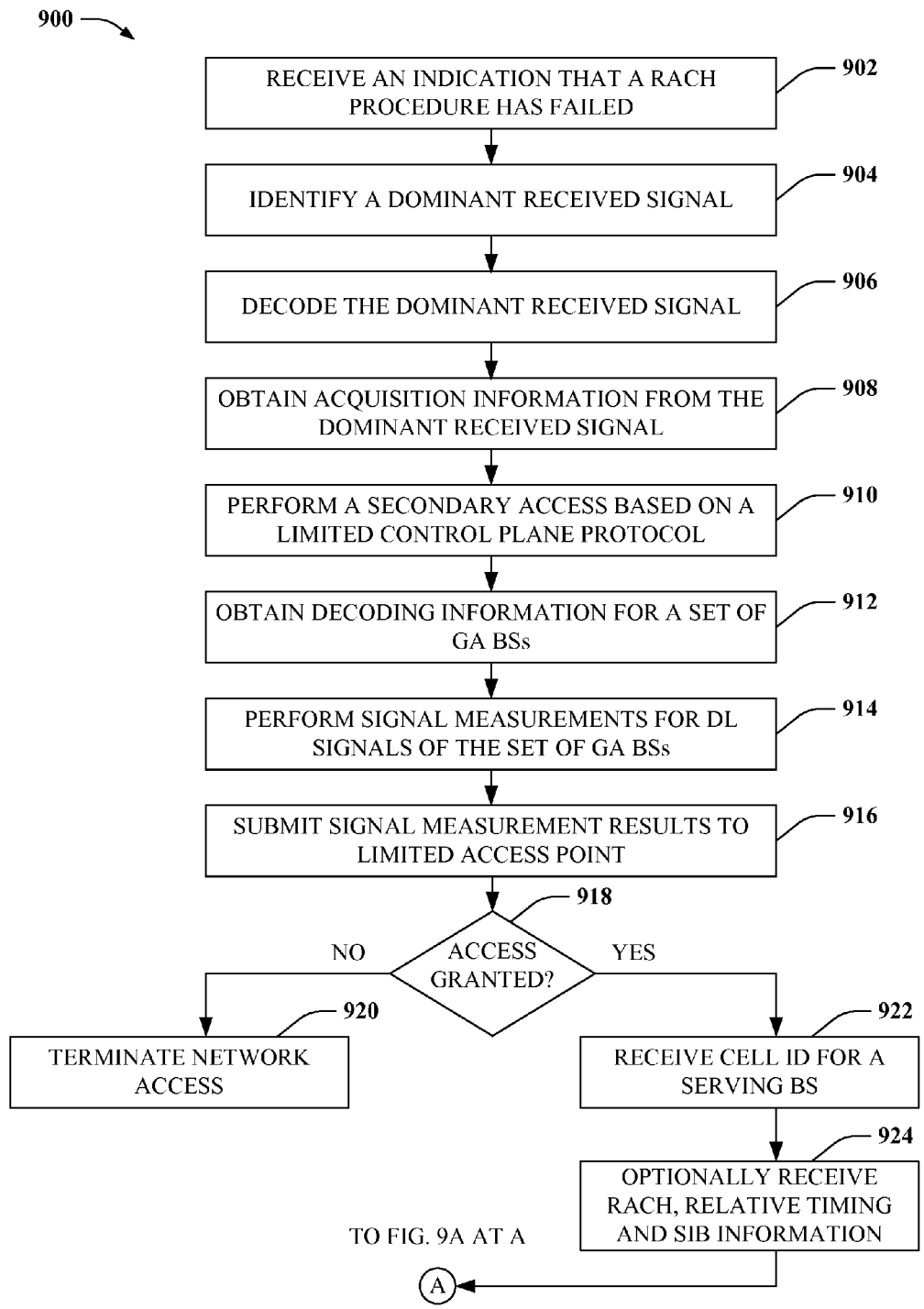
FIGS. 9 and 9A illustrate a flowchart of a sample methodology for limited control plane access to a wireless network according to still other aspects.
Figure 9A:
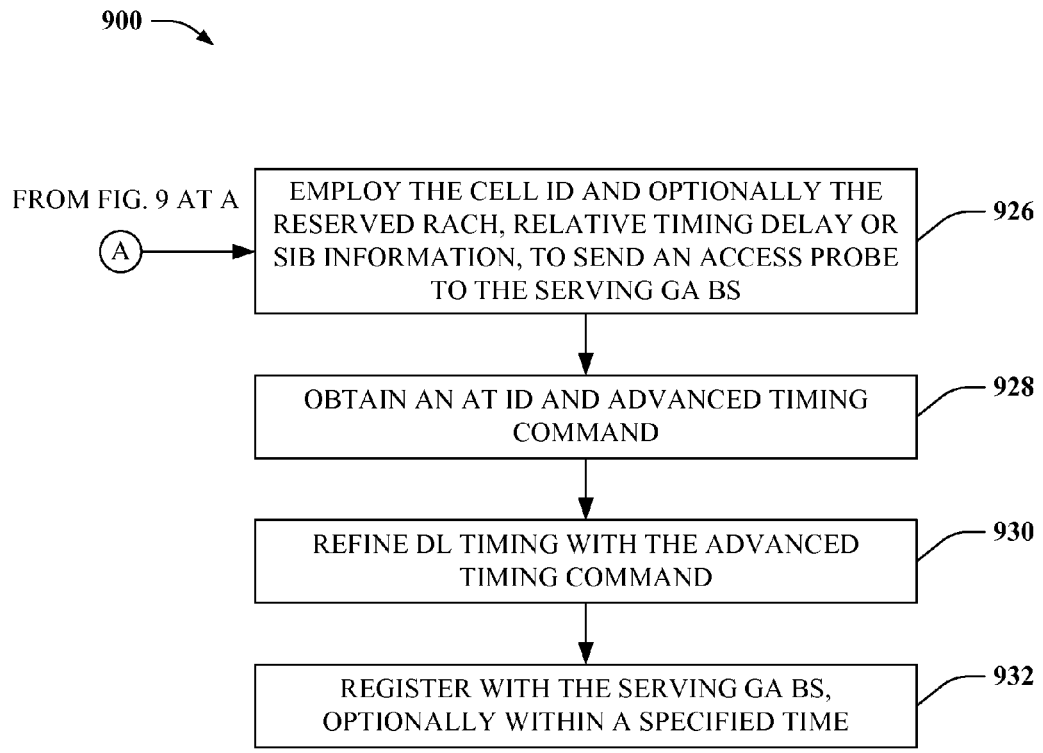

FIGS. 9 and 9A illustrate a flowchart of an example methodology 900 according to particular aspects disclosed herein. At 902, method 900 can comprise receiving an indication that a RACH procedure has failed. At 904, method 900 can comprise analyzed received wireless signals and identifying a dominant received signal (e.g., a signal of a dominant interferer). Further, at 906, method 900 can comprise decoding the dominant received signal, and obtaining signal acquisition information from the decoded signal at 908. This signal acquisition information can comprise a SIB transmission specifying a cell ID of an entity transmitting the dominant received signal, pilot information identifying a cell ID of the entity, synchronization information providing relative timing for the entity, or the like.

At 910, method 900 can comprise performing a secondary access procedure based on a limited control plane protocol, utilizing information obtained from the dominant received signal. At 912, method 900 can further comprise obtaining decoding information from the dominant interferer for a set of general access BSs neighboring the dominant interferer. This decoding information can be obtained, for instance, from a signal transmitted in response to the secondary access procedure at reference number 910. In at least one aspect, obtaining the decoding information can further comprise obtaining a cell ID or relative timing for at least a subset of the set of general access BSs. The cell ID or relative timing can be employed to identify pilot or synchronization signals transmitted by the subset of the set of general access BSs, and obtain received energy estimates pertaining to respective signals. Additionally, at 914, method 900 can comprise measuring relative strength of the pilot or synchronization signals of the subset of the set of BSs and, at 916, reporting the relative strength measurements to the dominant interferer.

In response to reporting the relative strength measurements, a wireless network associated with the dominant interferer can determine whether a requesting AT performing the secondary access procedure is authorized for wireless service. If not, a network rejection is sent in response and received by the requesting AT. If wireless service is authorized, a network access approval can be sent instead. The network access approval can be an explicit approval message, or an implicit message, comprising additional cell acquisition information described below. Further, it should be appreciated that network approval/rejection can be conveyed by the dominant interferer, or another BS associated with the wireless network.

At 918, method 900 can comprise determining whether network access is granted as a result of the secondary access procedure. If not, method 900 proceeds to 920, wherein communication with the dominant interferer is terminated. Otherwise, method 900 proceeds to 922, where method 900 comprises obtaining from the dominant interferer (or another BS) a cell ID of a general access BS (a serving BS) selected to serve the requesting AT. At 924, method 900 can optionally comprise obtaining relative timing delay and SIB information. As an alternative option at reference number 924, method 900 can comprise obtaining from the dominant interferer a reserved RACH sequence employed by the general access BS. From 922, or optionally from 924, method 900 proceeds to FIG. 9A, infra, at reference A.

Referring now to FIG. 9A, method 900 continues from reference A at 926. Particularly, at 926, method 900 can comprise employing the cell ID and optionally the reserved RACH sequence, SIB information, or relative timing delay, or a suitable combination thereof, and executing a conditional access procedure to the serving BS. According to various options, method 900 can comprise employing the timing delay or SIB information for the conditional access procedure, or can comprise executing the conditional access procedure with the reserved RACH sequence. In at least one aspects of this latter option, the reserved RACH sequence is derived from a root sequence, a plurality of root sequences, one or more cyclic shifts of the root sequence or the plurality of root sequences, or other suitable sequence derivation, reserved at least temporarily by the dominant interferer for the serving BS.

At 928, method 900 can comprise obtaining a RACH acknowledgment comprising pseudo-unique or unique ID and an advanced timing command. At 930, method 900 can comprise refining DL signal timing with the advanced timing command. At 932, method 900 can comprise registering with the serving BS within a specified time. In one instance, the specified time can be specified within the RACH acknowledgment. In another instance, the specified time can be included as part of a network standard. In yet another instance, the specified time can be part of network or cell configurations provided by higher layer signaling to the requesting AT via the serving BS. Once registration with the serving BS is complete, method 900 can terminate wireless communication with the dominant interferer.

Figure 10:
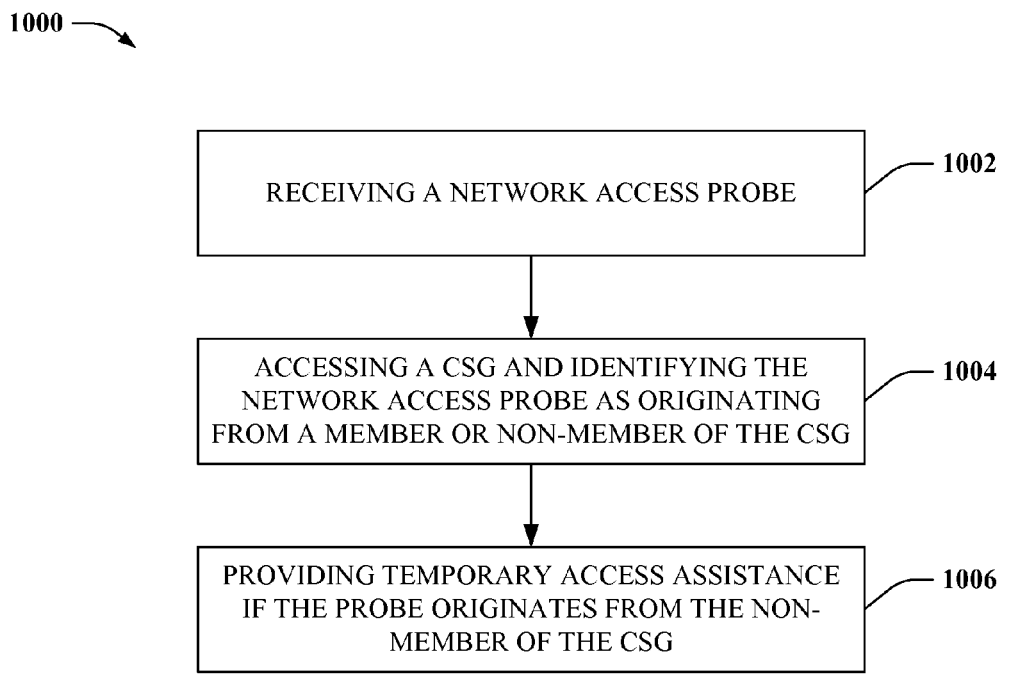
FIG. 10 depicts a flowchart of an example methodology for providing limited access for network acquisition according to still other aspects.

FIG. 10 depicts a flowchart of a sample methodology 1000 for providing limited access for network acquisition to facilitate wireless communication in a heterogeneous access point deployment. At 1002, method 1000 can comprise receiving a network access probe. The network access probe can be transmitted according to a RACH procedure employed by a wireless network, and received on resources established for the RACH. Additionally, at 1004, method 1000 can comprise accessing a CSG and identifying whether the network access probe as originating from a member of a non-member of the CSG. If the network access probe originates from the member of the CSG, a response to the network access probe can be transmitted that provides network access to a requesting AT. On the other hand, if the network access probe originates from the non-member of the CSG, at 1006, method 1000 can further comprise providing temporary access assistance in response to the network access probe.

Temporary access assistance according to method 1000 can take one or more of a variety of forms. For instance, this access assistance can include providing signal acquisition information for a neighboring macro network, and routing a network access request to a wireless network associated with the neighboring macro network. Alternatively, or in addition, providing temporary access assistance can further comprise relaying a cell ID or relative timing of a neighboring general access BS in response to the network access probe. In another example, providing temporary access assistance can instead comprise obtaining relative signal strength measurements of neighboring BSs from a requesting AT and submitting the relative signal strength measurements to a wireless network associated with the AT. As yet another example, providing temporary access assistance can further comprise obtaining an ID and a relative timing of a candidate serving BS selected by the wireless network for providing wireless service for the requesting AT, and forwarding the ID or the relative timing to the requesting AT. In at least one other example, providing temporary access assistance can further comprise obtaining an access refusal for the network access probe from the neighboring general access BS or a service provider of the requesting AT, and forwarding the network refusal to the requesting AT. In this manner, interference to the neighboring macro network can be mitigated, while network access functions are carried out for the requesting AT.

Figure 11:
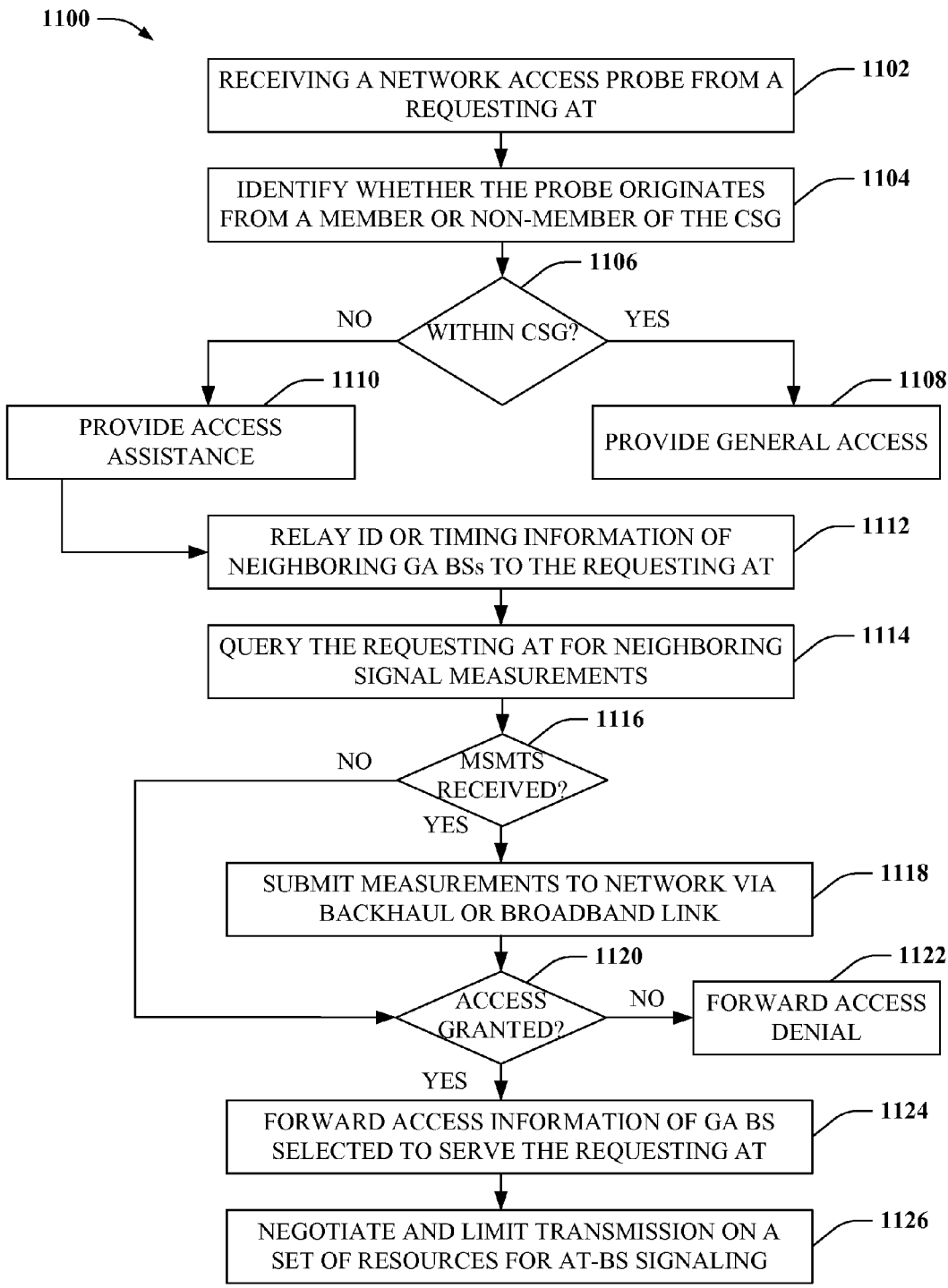
FIG. 11 depicts a flowchart of sample methodology for providing access assistance to a general access macro wireless network according to particular aspects.

FIG. 11 depicts a flowchart of a sample methodology 1100 for providing network assisted access according to one or more other aspects of the subject disclosure. At 1102, method 1100 can comprise receiving a network access probe from a requesting AT. At 1104, method 1100 can comprise identifying whether the network access probe originates from a member of a non-member of a CSG. At 1106, a determination can be made as to whether the requesting AT is included within the CSG. If no, method 1000 can proceed to 1110; otherwise method 1000 proceeds to 1108, where method 1000 can comprise providing general network access to the requesting AT.

At 1110, method 1100 can comprise providing temporary or limited access to the requesting AT for network acquisition. At 1112, method 1100 can comprise relaying cell ID or signal timing information of neighboring general access BSs to the requesting AT. At 1114, method 1100 can comprise querying the requesting AT for DL signal measurements pertaining to the neighboring general access BSs. At 1116 a determination is made as to whether the measurements are received. If DL signal measurements are received, method 1100 proceeds to 1118; otherwise method 1100 proceeds to 1120.

At 1118, method 1100 can comprise submitting DL signal measurements to a wireless network via a backhaul network, or via a broadband Internet link to a wide area network (e.g., the Internet, a private intranet, or the like). At 1120, method 1100 can comprise determining whether the wireless network approves access for the requesting AT. If not, method 1100 forwards an access denial to the requesting AT at 1122. Otherwise, method 1100 proceeds to 1124, where method 1100 can comprise forwarding access information of a general access BS selected to serve the requesting AT. At 1126, method 1100 can additionally comprise negotiating a set of resources to be at least in part reserved for communication between the requesting AT and the general access BS, and reducing transmit power, or blanking transmissions on the set of resources. Additionally, method 1100 can comprise terminating a wireless link with the requesting AT at 1126.

Figure 12:
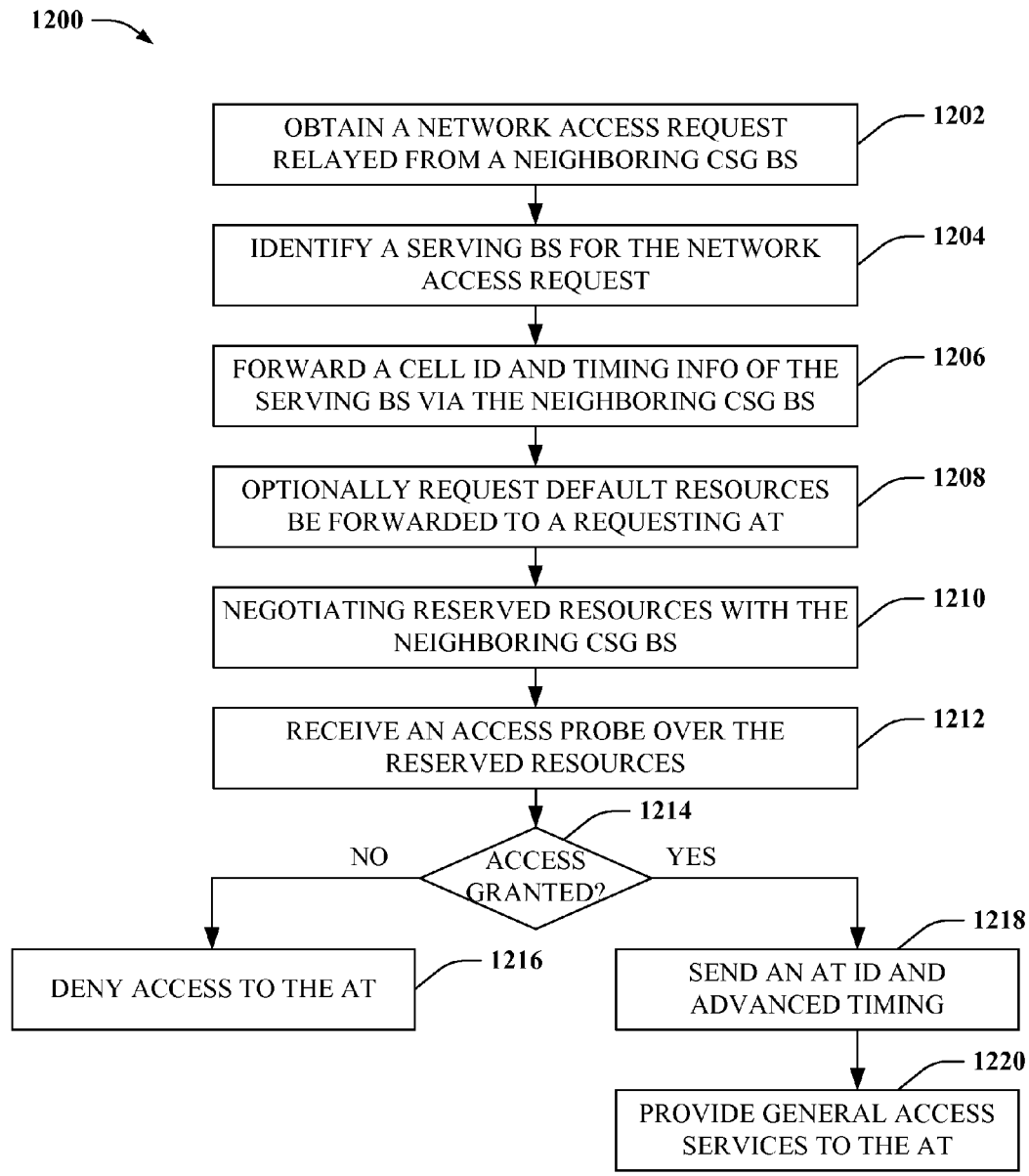
FIG. 12 illustrates a flowchart of an example methodology for providing network access assistance via a neighboring network access point in one or more aspects.

FIG. 12 illustrates a flowchart of an example methodology 1200 for facilitating network-assisted cell acquisition according to one or more aspects. At 1202, method 1200 can comprise obtaining a network access request that is relayed from a neighboring CSG BS. At 1204, method 1200 can comprise identifying a serving BS for the network access request. Identifying the serving BS can comprise referencing service protocols to select a nearby base station to be the serving BS. According to some aspects, selection can be based at least in part on signal measurements performed by a requesting AT. In other aspects, identifying the serving BS can comprise forwarding subscriber information to a serving network, and receiving signal acquisition information of the serving BS from the serving network.

AT 1206, method 1200 can comprise forwarding a cell ID and timing information of the serving BS via the neighboring CSG BS to the requesting AT if the requesting AT is authorized for network access. At 1208, method 1200 can optionally comprise requesting default access resources (e.g., time-frequency resources, RACH resources, a reserved RACH sequence, etc.) be forwarded to the requesting AT (e.g., by the neighboring CSG BS). Alternatively, at 1210, method 1200 can comprise negotiating reserved resources with the neighboring CSG BS, which can be employed for communication between the requesting AT and the serving BS. As an illustrative example, negotiating reserved resources can comprise determining a reserved RACH sequence allocated to the requesting AT. In at least one instance, the reserved RACH sequence is generated from a root sequence reserved for the requesting AT, or reserved for the serving BS.

At 1212, method 1200 can comprise receiving an access probe from the requesting AT over the reserved resources, or over the default access resources, according to a modified access protocol. Pursuant to the foregoing example, receiving the access probe can further comprise monitoring a reserved RACH and obtaining the access probe containing the reserved RACH sequence. At 1214, a determination can be made as to whether the requesting AT is authorized to access a wireless network. If authorization is denied, method 1200 proceeds to 1216 and forwards an access denial to the requesting AT, and wireless communication with the requesting AT can be terminated. Otherwise, method 1200 can proceed to 1218, where method 1200 can comprise responding to the reserved RACH sequence with a RACH acknowledgment and relaying an advanced timing command to the requesting AT in response to the access probe, if the requesting AT is authorized to access the serving BS, and provide general access services to the AT at 1220, if the access is authorized. Optionally, method 1200 can further comprise employing a predetermined set of resources, reserved for interference mitigation by the neighboring CSG BS, for communication between the requesting AT and the serving BS. These predetermined set of resources will generally be non-RACH resources, and can include control channel resources as well as shared channel resources (e.g., for voice or data communication).

Figure 13:
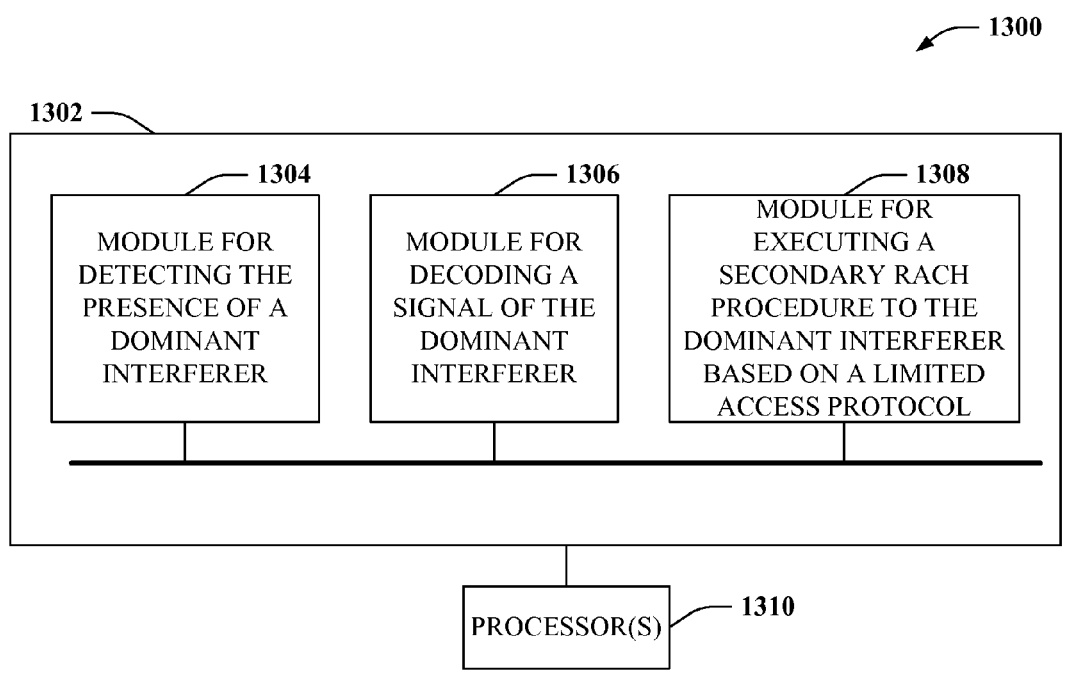
FIG. 13 depicts a block diagram of a sample apparatus for acquiring network assisted wireless access according to additional aspects.
Figure 14:
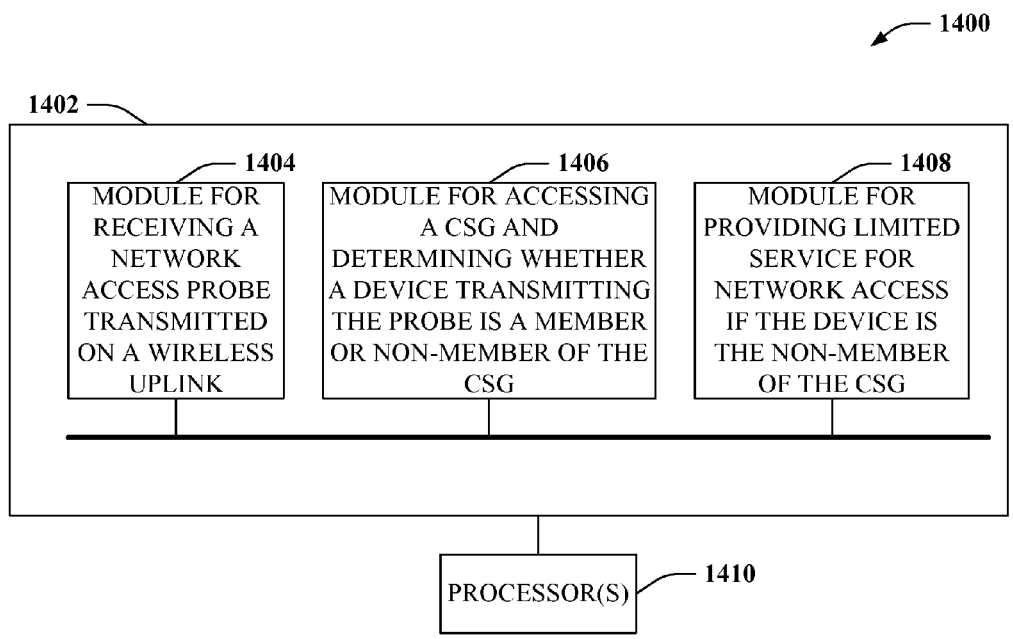
FIG. 14 illustrates a block diagram of an example apparatus that provides network assisted wireless access in other aspects.
Figure 15:
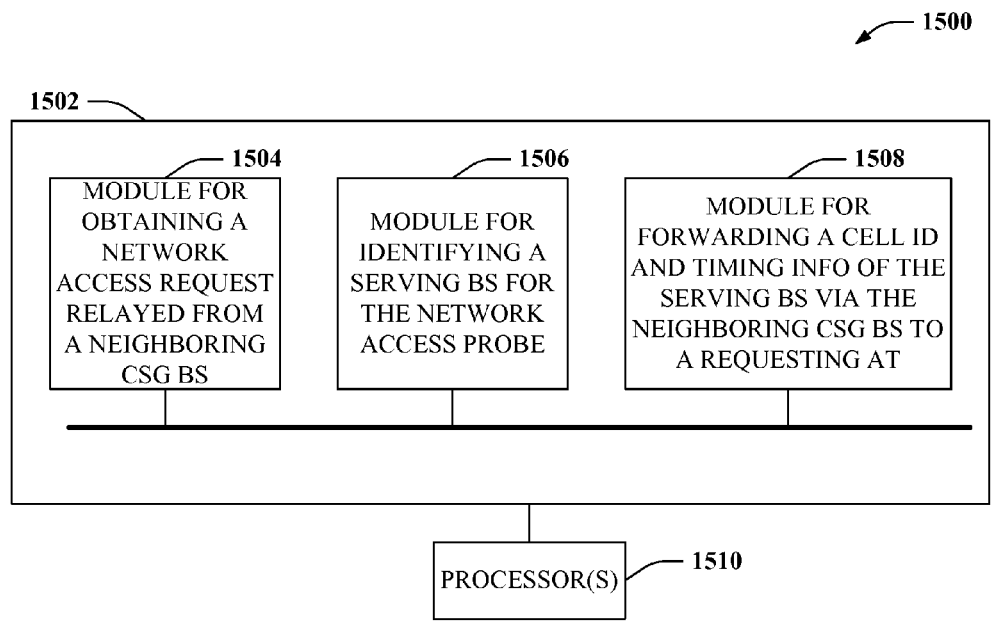
FIG. 15 illustrates a block diagram of a sample apparatus configured to facilitate network assisted access for a closed subscriber group base station.

FIGS. 13, 14 and 15 illustrate various example apparatuses 1300, 1400 and 1500 (e.g., electronic devices) for providing network-assisted cell acquisition in a heterogeneous access point wireless network according to aspects of the subject disclosure. For example, apparatuses 1300, 1400 and 1500 can reside at least partially within a wireless communication network and/or within a transmitter such as a node, base station, access point, user terminal, personal computer coupled with a mobile interface card, or the like. It is to be appreciated that apparatuses 1300, 1400 and 1500 are represented as including functional blocks, which can be functional blocks that represent functions implemented by a processor, software, or combination thereof (e.g., firmware).

Apparatus 1300 can comprise memory 1302 for storing modules or instructions configured to implement features of apparatus 1300, and a data processor 1310 for executing the modules or instructions. As depicted, apparatus 1300 can comprise a first module 1304 for detecting the presence of a dominant interferer. Moreover, apparatus 1300 can comprise a second module 1306 for decoding a signal of the dominant interferer. In one aspect of the subject disclosure, first module 1304 detects the presence of the dominant interferer at least in part by performing a random access procedure to obtain access to a wireless network and determining whether the random access procedure succeeds or fails. Failure can comprise expiration of a response timer without receiving a response, or receiving a rejection of the random access procedure. In at least one aspect, failure can instead comprise inability to decode a signal of a recognized network access point as a result of high interference. Further to the above, apparatus 1300 can comprise a third module 1308 for executing a secondary access procedure to the dominant interferer. The secondary access procedure can employ information derived from the signal of the dominant interferer decoded by the third module 1308. In addition, the secondary access procedure can be configured in accordance with a limited access protocol, which implies a request for limited or temporary access to the dominant interferer for assistance in acquiring a signal of a neighboring BS. For instance, the secondary access procedure can include a request for signal information of surrounding general access BSs from the dominant interferer, to facilitate apparatus 1300 communicating with one or more of the general access BSs.

Apparatus 1400 can comprise memory 1402 for storing modules or instructions for implementing functions of apparatus 1400, and a data processor 1410 for executing the instructions or modules. Particularly, apparatus 1400 can comprise a first module 1404 for receiving a network access probe on a wireless uplink. In addition, apparatus 1400 can comprise a second module 1406 for accessing a CSG and determining whether a device transmitting the network access probe is a member of the CSG, or a non-member of the CSG. If the device is the member of the CSG, apparatus 1400 can authorize general network service in response to the network access probe. Otherwise, apparatus 1400 can deny general network service, and initiate a third module 1408 for providing limited service for network access in response to the network access probe if the device is the non-member of the CSG, as described herein.

Apparatus 1500 can comprise memory 1502 for storing instructions or modules configured to implement features of apparatus 1500, as well as a data processor 1510 for executing the instructions or modules. Specifically, apparatus 1500 can comprise a first module 1504 for obtaining a network access request relayed from a neighboring CSG BS. Additionally, apparatus 1500 can comprise a second module 1506 for identifying a serving BS for a device transmitting the network access request. In at least one instance, the serving BS can be determined from signal measurements calculated by a requesting AT. For example, the signal measurements can be employed by apparatus 1500 to compare received signal strength of a set of candidate serving BSs observed by the requesting AT. According to this example, a candidate serving BS having highest signal strength as observed by the requesting AT is selected as the serving BS. In other aspects, the signal measurements are forwarded to a wireless service provider's network, which selects the serving BS and provides a cell ID of the serving BS in response. Further to the above, apparatus 1500 can comprise a third module 1508 for forwarding the cell ID and timing information of the serving BS to the requesting AT. In one aspect, the information can be forwarded OTA via a cellular broadcast channel, or via some DL resources reserved for the requesting AT. In another aspect, the information can be forwarded to the requesting AT via the neighboring CSG BS that provided the rejected network access probe.

Figure 16:
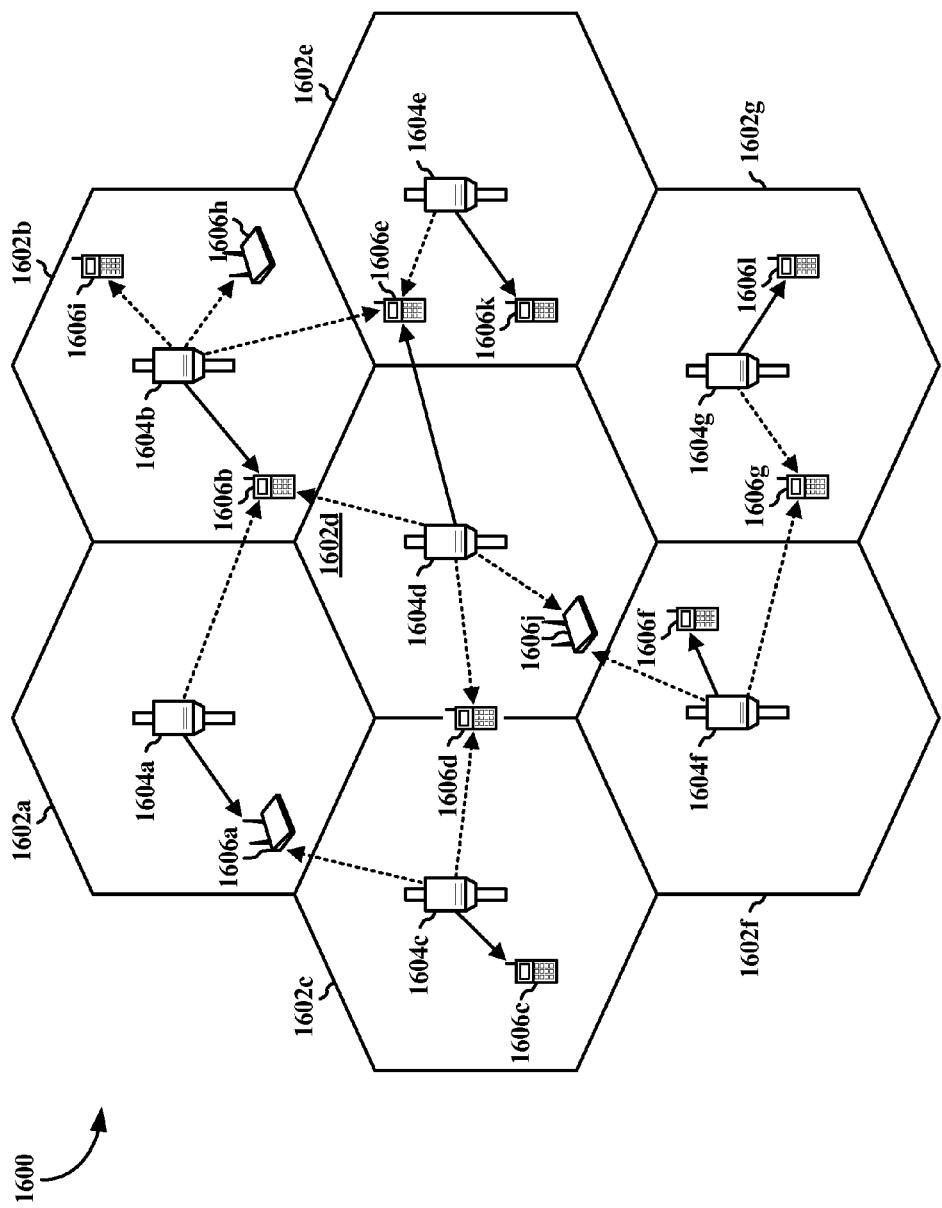
FIG. 16 illustrates a block diagram of an example wireless communication system for various aspects of the subject disclosure.

FIG. 16 illustrates an exemplary wireless communication system 1600 configured to support a number of users, in which various disclosed embodiments and aspects may be implemented. As shown in FIG. 16, by way of example, wireless communication system 1600 provides communication for multiple cells 1602, such as, for example, macro cells 1602*a*-1602*g*, with each cell being serviced by a corresponding access point (AP) 1604 (such as APs 1604*a*-1604*g*). Each cell may be further divided into one or more sectors. Various access terminals (ATs) 1606, including ATs 1606*a*-1606*k*, also known interchangeably as user equipment (UE) or mobile stations, are dispersed throughout the system. Each AT 1606 may communicate with one or more APs 1604 on a forward link (FL) and/or a reverse link (RL) at a given moment, depending upon whether the AT is active and whether it is in soft handoff, for example. The wireless communication system 1600 may provide service over a large geographic region, for example, macro cells 1602*a*-1602*g* may cover a few blocks in a neighborhood.

Figure 17:
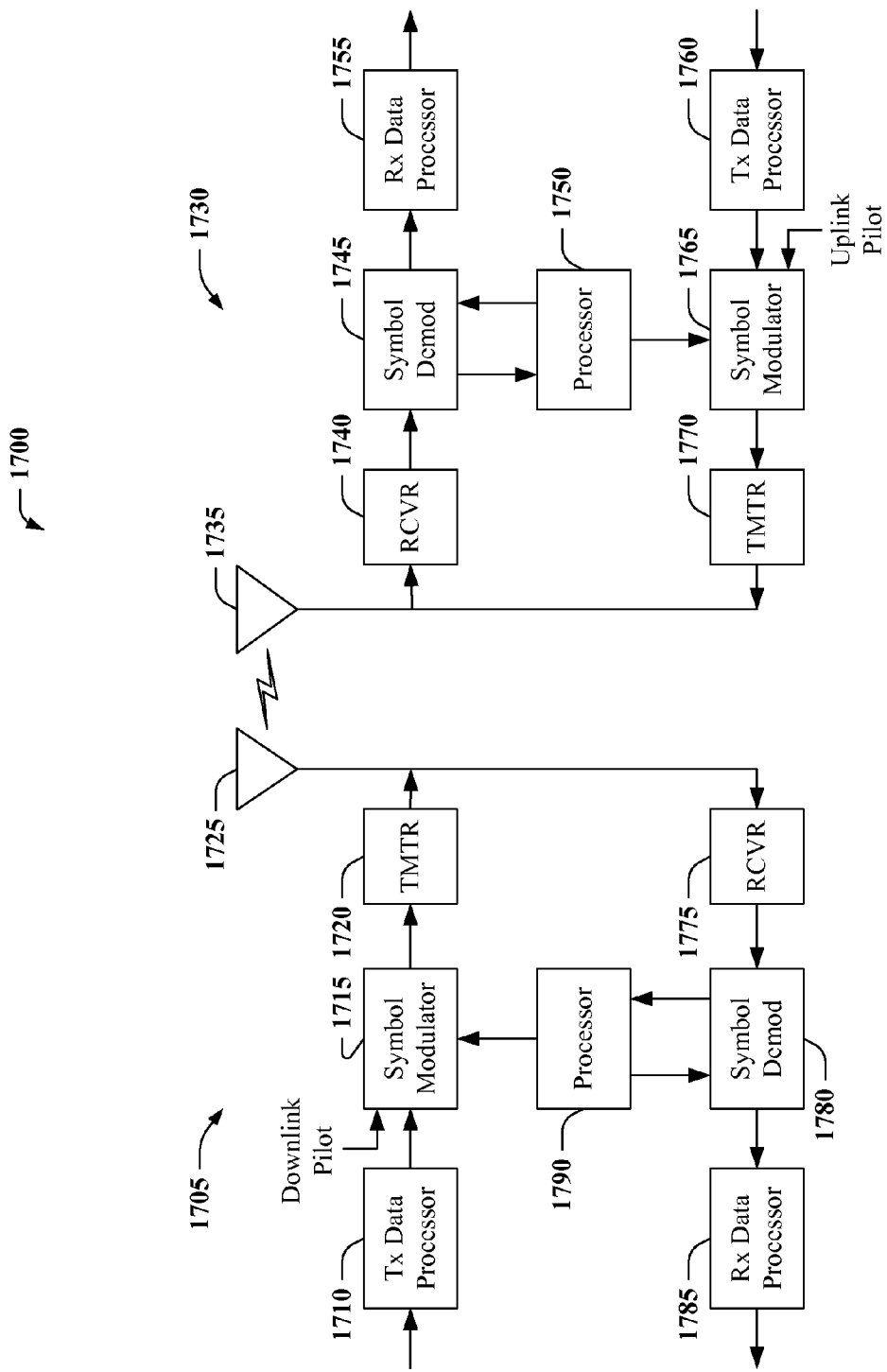
FIG. 17 illustrates a block diagram of an example wireless transmit-receive chain facilitating wireless communication according to some disclosed aspects.

FIG. 17 depicts a block diagram of an example system 1700 that can facilitate wireless communication according to some aspects disclosed herein. On a downlink, at access point 1705, a transmit (TX) data processor 1710 receives, formats, codes, interleaves, and modulates (or symbol maps) traffic data and provides modulation symbols ("data symbols"). A symbol modulator 1715 receives and processes the data symbols and pilot symbols and provides a stream of symbols. A symbol modulator 1715 multiplexes data and pilot symbols and provides them to a transmitter unit (TMTR) 1720. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1720 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1725 to the terminals. At terminal 1730, an antenna 1735 receives the downlink signal and provides a received signal to a receiver unit (RCVR) 1740. Receiver unit 1740 conditions (e.g., filters, amplifies, and frequency downconverts) the received signal and digitizes the conditioned signal to obtain samples. A symbol demodulator 1745 demodulates and provides received pilot symbols to a processor 1750 for channel estimation. Symbol demodulator 1745 further receives a frequency response estimate for the downlink from processor 1750, performs data demodulation on the received data symbols to obtain data symbol estimates (which are estimates of the transmitted data symbols), and provides the data symbol estimates to an RX data processor 1755, which demodulates (i.e., symbol demaps), deinterleaves, and decodes the data symbol estimates to recover the transmitted traffic data. The processing by symbol demodulator 1745 and RX data processor 1755 is complementary to the processing by symbol modulator 1715 and TX data processor 1710, respectively, at access point 1705.

On the uplink, a TX data processor 1760 processes traffic data and provides data symbols. A symbol modulator 1765 receives and multiplexes the data symbols with pilot symbols, performs modulation, and provides a stream of symbols. A transmitter unit 1770 then receives and processes the stream of symbols to generate an uplink signal, which is transmitted by the antenna 1735 to the access point 1705. Specifically, the uplink signal can be in accordance with SC-FDMA requirements and can include frequency hopping mechanisms as described herein.

At access point 1705, the uplink signal from terminal 1730 is received by the antenna 1725 and processed by a receiver unit 1775 to obtain samples. A symbol demodulator 1780 then processes the samples and provides received pilot symbols and data symbol estimates for the uplink. An RX data processor 1785 processes the data symbol estimates to recover the traffic data transmitted by terminal 1730. A processor 1790 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1790 and 1750 direct (e.g., control, coordinate, manage, etc.) operation at access point 1705 and terminal 1730, respectively. Respective processors 1790 and 1750 can be associated with memory units (not shown) that store program codes and data. Processors 1790 and 1750 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1790 and 1750.

Figure 18:
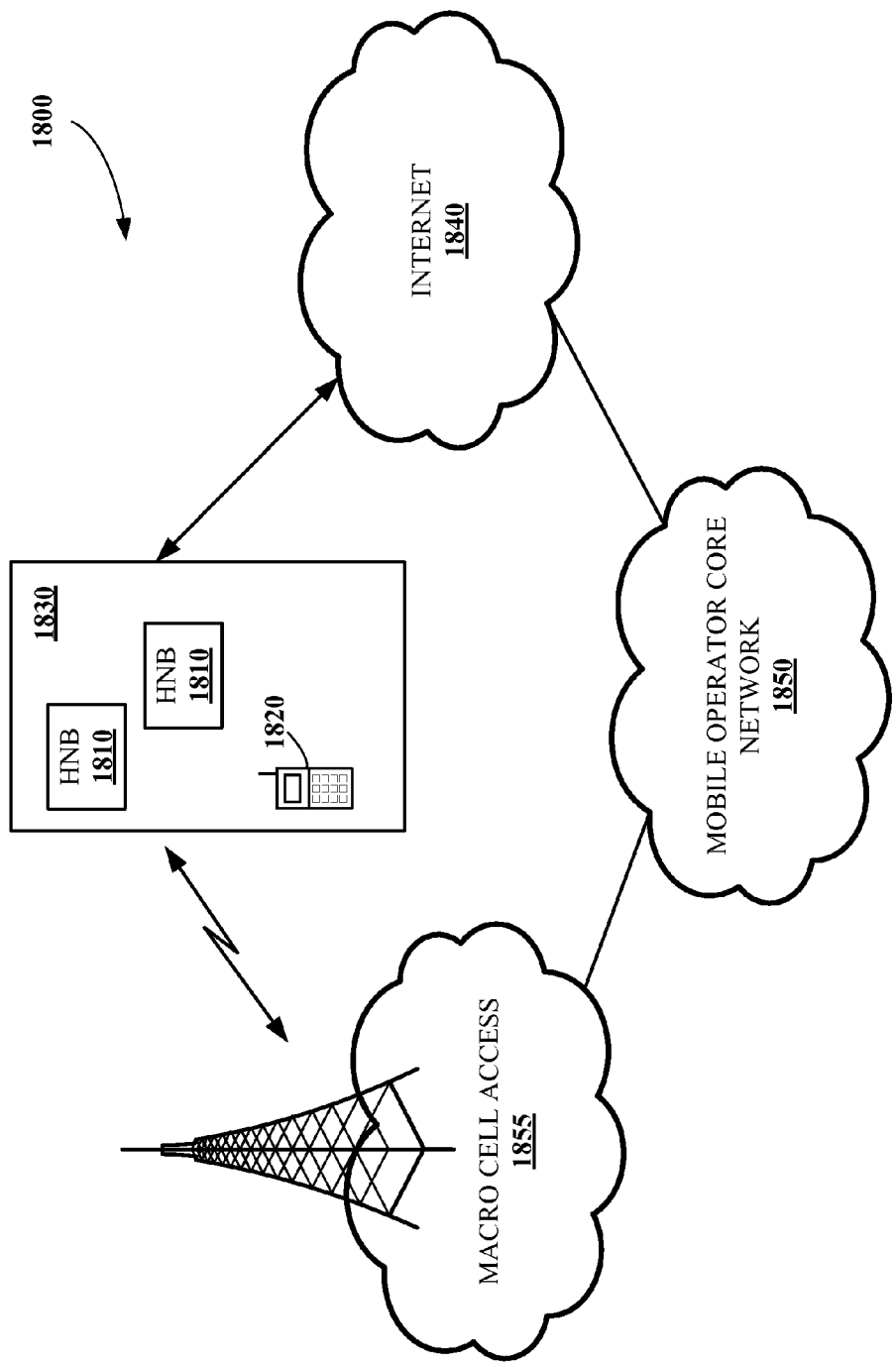
FIG. 18 illustrates a block diagram of an example communication system to enable deployment of access point base stations within a network environment.

FIG. 18 illustrates an exemplary communication system to enable deployment of access point base stations within a network environment. As shown in FIG. 18, the system 1800 includes multiple access point base stations or Home Node B units (HNBs) or Femto cells, such as, for example, HNBs 1810, each being installed in a corresponding small scale network environment, such as, for example, in one or more user residences 1830, and being configured to serve associated, as well as alien, user equipment (UE) 1820. Each HNB 1810 is further coupled to the Internet 1840 and a mobile operator core network 1850 via a DSL router (not shown) or, alternatively, a cable modem (not shown).

Although embodiments described herein use 3GPP terminology, it is to be understood that the embodiments may be applied to 3GPP (Rel99, Rel5, Rel6, Rel7) technology, as well as 3GPP2 (1xRTT, 1xEV-DO Rel0, RevA, RevB) technology and other known and related technologies. In such embodiments described herein, the owner of the HNB 1810 subscribes to mobile service, such as, for example, 3G mobile service, offered through the mobile operator core network 1850, and the UE 1820 is capable to operate both in macro cellular environment and in residential small scale network environment. Thus, the HNB 1810 is backward compatible with any existing UE 1820.

Furthermore, in addition to the mobile operator core network 1850, the UE 1820 can only be served by a predetermined number of HNBs 1810, namely the HNBs 1810 that reside within the user's residence 1830, and cannot be in a soft handover state with the mobile operator core network 1850. The UE 1820 can communicate with either the mobile operator core network 1850 directly via a macro cell access 1855, or via the HNBs 1810, but not both simultaneously. As long as the UE 1820 is authorized to communicate with the HNB 1810, within the user's residence it is desired that the UE 1820 communicate only with the associated HNBs 1810.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for improved cell access in a heterogeneous access point wireless environment, comprising:
   detecting a presence of a dominant interferer observed at an access terminal (AT), wherein the AT is a non-member of a closed subscriber group (CSG) of the dominant interferer;
   decoding a signal of the dominant interferer;
   executing a secondary access procedure from the AT to the dominant interferer, in response to detecting the presence of the dominant interferer and decoding the signal of the dominant interferer, wherein the secondary access procedure is in accordance with a limited access protocol configured to allow a limited access to the dominant interferer for the AT to facilitate a macro network access for the AT;
   obtaining a random access channel (RACH) acknowledgment from a serving base station (BS) in response to the executing of the secondary access procedure, wherein the RACH acknowledgement comprises an advanced timing command;
   refining downlink signal timing with the advanced timing command; and
   registering with the serving BS within a specified time.

2. The method of claim 1, wherein detecting the presence of the dominant interferer comprises:
   performing a random access procedure to obtain access to a wireless network; and
   determining whether the random access procedure fails.

3. The method of claim 1, further comprising obtaining decoding information from the dominant interferer for a set of general access base stations (BSs) neighboring the dominant interferer.

4. The method of claim 3, wherein obtaining the decoding information further comprises obtaining a cell identifier (ID) or relative timing for the set of general access BSs.

5. The method of claim 4, further comprising measuring relative strength of pilot or synchronization signals of a subset of the set of general access BSs and reporting the relative strength to the dominant interferer.

6. The method of claim 1, further comprising obtaining from the dominant interferer a cell ID of the serving BS.

7. The method of claim 6, further comprising executing a conditional access procedure to the serving BS.

8. The method of claim 7, further comprising obtaining relative timing delay and system information block (SIB) information and employing the relative timing delay or SIB information for the conditional access procedure.

9. The method of claim 7, further comprising obtaining from the dominant interferer a reserved RACH sequence employed by the serving BS, and executing the conditional access procedure with the reserved RACH sequence.

10. The method of claim 9, wherein the reserved RACH sequence is derived from a root sequence reserved at least temporarily by the dominant interferer for the serving BS.

11. An apparatus for wireless communication, comprising:
    a wireless communication interface for exchanging wireless signals with a wireless network;
    a memory for storing instructions configured to obtain conditional network access upon a failed access request; and
    a data processor that executes modules to implement the instructions, the modules comprising:
      a demodulator that detects a presence of a dominant interferer observed at the apparatus, wherein the apparatus is a non-member of a closed subscriber group (CSG) of the dominant interferer, and that decodes a signal of the dominant interferer;
      a conditional access module that, when the demodulator detects the presence of the dominant interferer and decodes the signal of the dominant interferer, sends an access probe from the apparatus to the dominant interferer according to a modified access protocol configured to allow a limited access to the dominant interferer for the apparatus to facilitate a macro network access for the apparatus, wherein the apparatus obtains a random access channel (RACH) acknowledgment from a serving base station (BS) in response to the access probe, wherein the RACH acknowledgment comprises an advanced timing command; and
      a timing synchronization module that refines downlink signal timing with the advanced timing command, wherein the apparatus registers with the serving BS within a time specified in the RACH acknowledgment.

12. The apparatus of claim 11, further comprising an analysis module that determines whether a network access procedure performed by the apparatus fails in order to facilitate detecting the presence of the dominant interferer.

13. The apparatus of claim 11, further comprising an interface module that obtains decoding information from the dominant interferer for a set of general access base stations (a set of general access BSs) neighboring the dominant interferer.

14. The apparatus of claim 13, further comprising a measurement module that calculates relative strength of pilot or synchronization signals of a subset of the set of general access BSs and reports the relative strength to the dominant interferer.

15. The apparatus of claim 13, wherein the interface module obtains a cell ID of the serving BS.

16. The apparatus of claim 15, wherein the conditional access module transmits a network access probe to the serving BS.

17. The apparatus of claim 16, wherein:
the interface module obtains relative timing delay and system information block (SIB) information from the dominant interferer; and
the conditional access module employs the relative timing delay and SIB information to configure the network access probe.

18. The apparatus of claim 16, wherein:
the interface module obtains a reserved RACH sequence employed by the serving BS; and
the conditional access module transmits the network access probe with the reserved RACH sequence.

19. The apparatus of claim 18, wherein the reserved RACH sequence is derived from a root sequence reserved by the dominant interferer for the serving BS.

20. An apparatus configured for network-assisted wireless access, comprising:
means for detecting a presence of a dominant interferer observed at the apparatus, wherein the apparatus is a non-member of a closed subscriber group (CSG) of the dominant interferer;
means for decoding a signal of the dominant interferer;
means for executing a secondary access procedure of the apparatus to the dominant interferer, in response to detecting the presence of the dominant interferer and decoding the signal of the dominant interferer, wherein the secondary access procedure is in accordance with a limited access protocol configured to allow a limited access to the dominant interferer for the apparatus to facilitate a macro network access for the apparatus;
means for obtaining a random access channel (RACH) acknowledgment from a serving base station (BS) in response to the executing of the secondary access procedure, wherein the RACH acknowledgement comprises an advanced timing command;
means for refining downlink signal timing with the advanced timing command; and
means for registering with the serving BS within a specified time.

21. At least one processor configured for network-assisted wireless access, comprising:
a first module for detecting a presence of a dominant interferer observed at an access terminal (AT), wherein the AT is a non-member of a closed subscriber group (CSG) of the dominant interferer;
a second module for decoding a signal of the dominant interferer; and
a third module for executing a secondary access procedure from the AT to the dominant interferer, in response to detecting the presence of the dominant interferer and decoding the signal of the dominant interferer, wherein the secondary access procedure is in accordance with a limited access protocol configured to allow a limited access to the dominant interferer for the AT to facilitate a macro network access for the AT;
a fourth module for obtaining a random access channel (RACH) acknowledgment from a serving base station (BS) in response to the executing of the secondary access procedure, wherein the RACH acknowledgement comprises an advanced timing command;
a fifth module for refining downlink signal timing with the advanced timing command; and
a sixth module for registering with the serving BS within a specified time.

22. A computer program product, comprising:
a non-transitory computer-readable medium, comprising:
a first set of codes for causing a computer to detect a presence of a dominant interferer observed at an access terminal (AT), wherein the AT is a non-member of a closed subscriber group (CSG) of the dominant interferer;
a second set of codes for causing the computer to decode a signal of the dominant interferer; and
a third set of codes for causing the computer to execute a secondary access procedure from the AT to the dominant interferer, in response to detecting the presence of the dominant interferer and decoding the signal of the dominant interferer, wherein the secondary access procedure is in accordance with a limited access protocol configured to allow a limited access to the dominant interferer for the AT to facilitate a macro network access for the AT;
a fourth set of codes for causing the computer to obtain a random access channel (RACH) acknowledgment from a serving base station (BS) in response to the computer executing the secondary access procedure, wherein the RACH acknowledgement comprises an advanced timing command;
a fifth set of codes for causing the computer to refine downlink signal timing with the advanced timing command; and
a sixth set of codes for causing the computer to register with the serving BS within a specified time.

* * * * *